(12) United States Patent
Taho et al.

(10) Patent No.: US 8,187,099 B2
(45) Date of Patent: May 29, 2012

(54) GAME METHOD AND APPARATUS FOR ENABLING A VIDEO GAME SYSTEM CONSOLE TO EXECUTE VIDEO GAME PROGRAMS ORIGINALLY WRITTEN FOR EXECUTION ON ARCHITECTURALLY DIFFERENT VIDEO GAME PLATFORMS

(75) Inventors: Sagahiro Taho, Kyoto (JP); Hideya Akasaka, Kyoto (JP); Teruki Murakawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 217 days.

(21) Appl. No.: 11/205,324

(22) Filed: Aug. 17, 2005

(65) Prior Publication Data

US 2006/0009290 A1 Jan. 12, 2006

Related U.S. Application Data

(63) Continuation of application No. 09/774,660, filed on Feb. 1, 2001, now Pat. No. 6,955,606.

(60) Provisional application No. 60/206,977, filed on May 25, 2000.

(30) Foreign Application Priority Data

| Mar. 30, 2000 | (JP) | ................................. 2000-095808 |
| Jun. 20, 2000 | (JP) | ................................. 2000-184954 |
| Jun. 20, 2000 | (JP) | ................................. 2000-184955 |

(51) Int. Cl.
*A63F 9/24* (2006.01)

(52) U.S. Cl. ........................................................ 463/42

(58) Field of Classification Search .................... 463/43, 463/42

See application file for complete search history.

(56) References Cited

U.S. PATENT DOCUMENTS 4,903,218 A 2/1990 Longo et al.
(Continued)

FOREIGN PATENT DOCUMENTS

EP 0 918 298 A1 5/1999
(Continued)

OTHER PUBLICATIONS

List of Emulators, Wikipedia, http://en.wikipedia.org/w/index.php?title=List_of_emulators.*

(Continued)

*Primary Examiner* — Corbett B Coburn
(74) *Attorney, Agent, or Firm* — Nixon & Vanderhye P.C.

(57) ABSTRACT

A video game selection program runs on a home video game console system connected to the Internet and displays on a home color television set a menu of one or more video game titles corresponding to video game programs available via the Internet from a remote server. At least some video game programs available from the server are designed for execution by a computer having a different hardware architecture than the home video game console system. The video game selection program, in response to selection of a video game title on the menu, sends game title ID information to the server and downloads and stores both a video game program corresponding to a title selected from said menu and corresponding emulator program of a type especially suited for enabling execution of the selected video game program on the home video game console. The video game selection program further creates and stores a table for associating downloaded video game titles with corresponding emulator program types and inhibits the downloading of emulator program types which have been previously downloaded and stored on the home video game system.

13 Claims, 22 Drawing Sheets

U.S. PATENT DOCUMENTS

| | | | | |
|---|---|---|---|---|
| 5,005,122 A * | 4/1991 | Griffin et al. | | 709/203 |
| 5,404,527 A * | 4/1995 | Irwin et al. | | 709/222 |
| 5,412,800 A | 9/1995 | Bril et al. | | |
| 5,448,263 A | 9/1995 | Martin | | |
| 5,497,479 A * | 3/1996 | Hornbuckle | | 463/29 |
| 5,552,799 A | 9/1996 | Hashiguchi | | |
| 5,575,717 A | 11/1996 | Houriet, Jr. et al. | | |
| RE35,520 E | 5/1997 | Darling at al | | |
| 5,892,939 A | 4/1999 | Call et al. | | |
| 5,959,596 A | 9/1999 | McCarten et al. | | |
| 6,044,408 A | 3/2000 | Engstrom et al. | | |
| 6,115,054 A | 9/2000 | Giles | | |
| 6,132,315 A | 10/2000 | Miyamoto et al. | | |
| 6,238,290 B1 | 5/2001 | Tarr et al. | | |
| 6,468,160 B2 | 10/2002 | Eliott | | |
| 6,672,963 B1 | 1/2004 | Link | | |
| 6,884,171 B2 | 4/2005 | Eck et al. | | |
| 7,338,376 B2 * | 3/2008 | Eck et al. | | 463/42 |
| 7,465,231 B2 * | 12/2008 | Lewin et al. | | 463/37 |

FOREIGN PATENT DOCUMENTS

| | | |
|---|---|---|
| JP | 04-113865 | 4/1992 |
| JP | 05-181673 | 7/1993 |
| JP | 05-210786 | 8/1993 |
| JP | 05-324527 | 12/1993 |
| JP | 08-272712 | 10/1996 |
| JP | 10-091371 | 4/1998 |
| JP | 10-099544 | 4/1998 |
| JP | 10-201947 | 8/1998 |
| JP | 11-319314 | 11/1999 |

OTHER PUBLICATIONS

Console Emulator, Wikipedia, http://en.wikipedia.org/w/index.php?title=Consloe_emulator.*

Wikipedia article on MAC Address, http://en.wikipedia.org/wiki/MAC_address.*

Directory Listing of /~gator/mame, http://user.cs/tu-berlin.de/~gator/mame.

Frontends, http://www.mame.net/frontend.html.

FAQ, http://www.mame.net/mamefaq.html.

Gamelist.txt, http://www.mame.net/gamelist.html.

Gauntlet, http://en.wikipedia.org/wiki/Gauntlet_(game).

Mame32 Overview, http://www.clasicgaming.com/mame32qa/help/mame32_overview.htm.

Mame, http://www.mame.net/, 1997.

Mame.txt, http://www.mame.net/readme.html.

Shih, Ming-yu, Readmee.txt, "SMYGB—Game Boy Emulator v0.20," (smy@ip.csie.ncu.edu.tw), HTTP://www.billyjr.com/smygb/ (Jan. 2, 1999).

"Snarkofagen's Emulation, The Latest Emulator News," HTTP://home.swipnet.se/snarkofagen/, (Nov. 15, 1999 to Dec. 29, 1999).

"NO$GMB—version 2.5, nocash gameboy emulator/debugger for dos/windows" HTTP://www.work.de/nocash/gmb.htm.

"Welcome to my Vgb page" HTTP://elektron.et.tudelft.nl/~jdegoede/vgb.html.

Bleem!™ Play hundreds of Playstation Games on Your PC, © 1998-1999.

Windows.txt, http://www.mame.net/readmewin.html.

Japanese Office Action dated Sep. 29, 2009 (2 pages).

Japanese hearing correspondence issued in corresponding Japanese Application No. 2000-125832 dated Nov. 9, 2010 (3 pages).

German Office Action w/ English translation dated Oct. 15, 2010 (14 pages total).

Seamus Ross et al., "Digital Archaeology: Rescuing Neglected and Damaged Data Resources", A JISC/NPO Study within the Electronic Libraries (eLib) Programme on the Preservation of Electronic Materials, Library Information Technology Centre, London, Feb. 1999.

Jeff Rothenberg, "Avoiding Technological Quicksand: Finding a Viable Technical Foundation for Digital Preservation", Council on Library and Information Resources, Washington, DC, Jan. 1999.

Japanese Office Action dated May 24, 2011 in corresponding Japanese Patent Application No. 2000-125832 (16 pages).

* cited by examiner

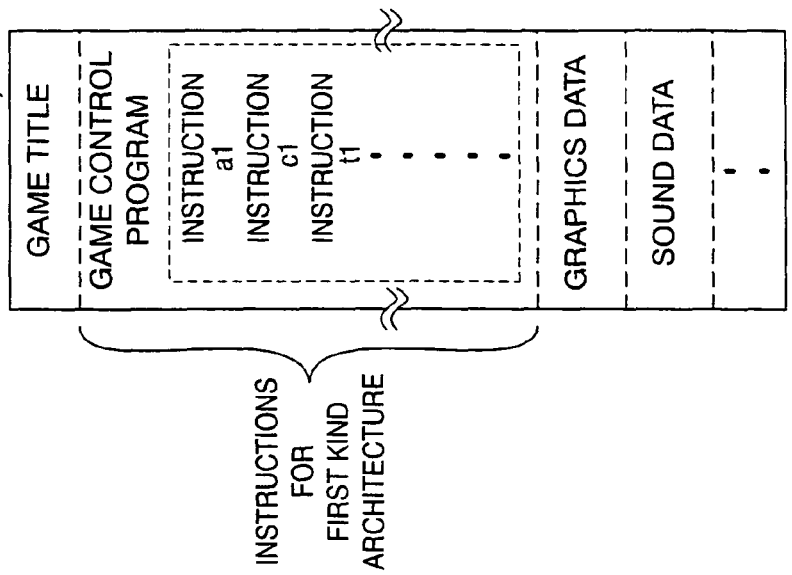
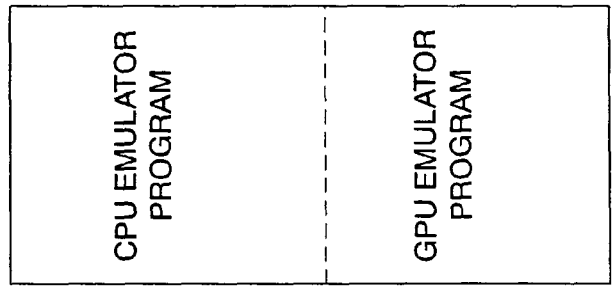
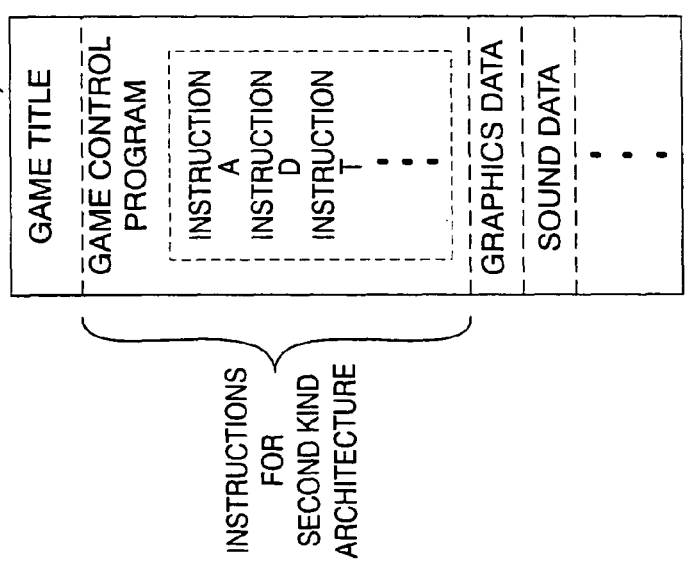

FIG.6

| INSTRUCTIONS CONSTITUTING GAME PROGRAM FOR SECOND GAME MACHINE (INSTRUCTIONS OF SECOND KIND ARCHITECTURE) | EMULATOR PROGRAM | |
|---|---|---|
| | CPU EMULATOR (INSTRUCTIONS OF FIRST KIND ARCHITECTURE) | GPU EMULATOR (INSTRUCTION OF FIRST KIND ARCHITECTURE) |
| INSTRUCTION A | PROCESSING a (INSTRUCTIONS a1,a2,a3) | — |
| INSTRUCTION B | PROCESSING b (INSTRUCTION b1) | — |
| · · · | · · · | · · · |
| INSTRUCTION J | PROCESSING j (INSTRUCTIONS j1,j2) | — |
| INSTRUCTION K + INSTRUCTION L | PROCESSING kl (INSTRUCTION kl1) | — |
| · · · | · · · | · · · |
| INSTRUCTION T (EXCLUSIVE INSTRUCTION FOR GPU) | — | PROCESSING t1 {PROCESSING t2 {PROCESSING t3 (INSTRUCTIONS t11,t12,...)...} |
| INSTRUCTION U (EXCLUSIVE INSTRUCTION FOR GPU) | — | PROCESSING u (INSTRUCTIONS u1,u2,u3) |
| · · · | · · · | · · · |

FIG.16  DEMONSTRATION PROGRAM LIST DATA

| GAME TITLE | DEMONSTRATION PROGRAM |
|---|---|
| GAME TITLE 1 | DEMONSTRATION PROGRAM DP1 |
| ⋮ | ⋮ |
| GAME TITLE i | DEMONSTRATION PROGRAM DP i |
| ⋮ | ⋮ |
| GAME TITLE n | DEMONSTRATION PROGRAM DPn |

SAME AS S3(S6)-S5 OF FIGURE 7

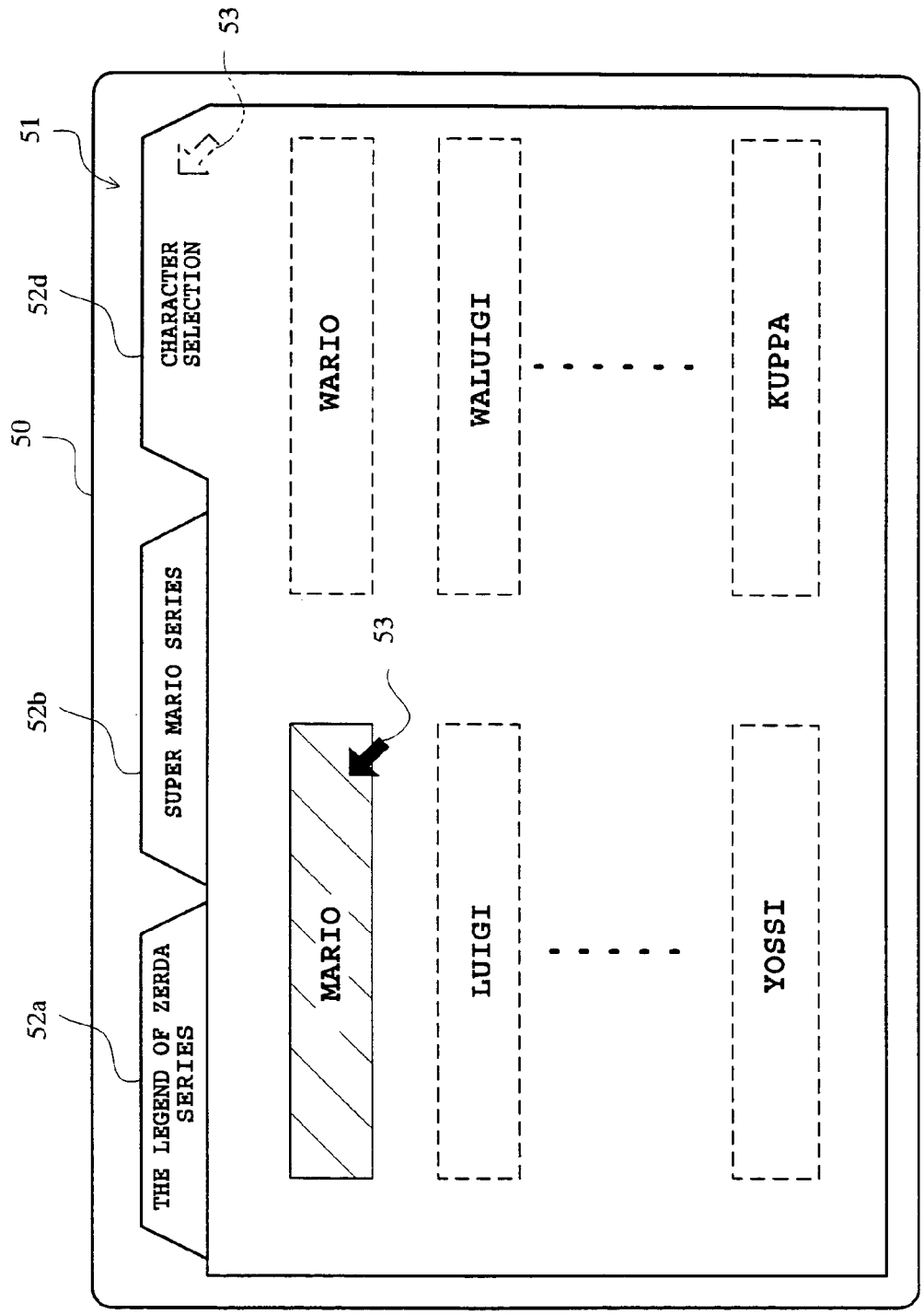

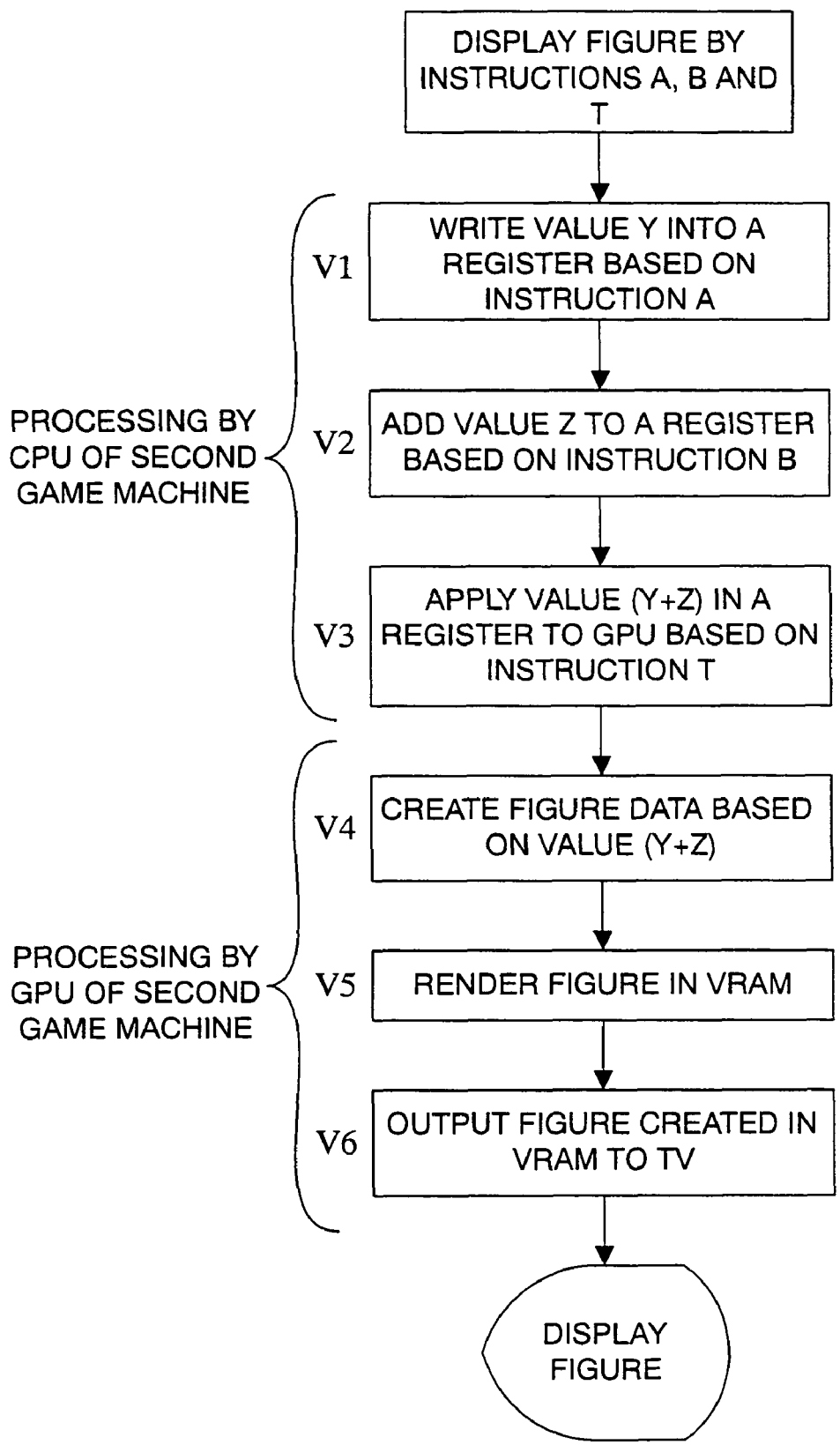

GAME METHOD AND APPARATUS FOR ENABLING A VIDEO GAME SYSTEM CONSOLE TO EXECUTE VIDEO GAME PROGRAMS ORIGINALLY WRITTEN FOR EXECUTION ON ARCHITECTURALLY DIFFERENT VIDEO GAME PLATFORMS

This application is a continuation of application Ser. No. 09/774,660, filed Feb. 1, 2001, now U.S. Pat. No. 6,955,606. This application also claims the benefit of provisional Appln. No. 60/206,977, filed May 25, 2000.

FIELD OF THE INVENTION

The present invention generally relates to game information storage mediums and game systems. More particularly, the invention relates to a game information storage medium and a game system using the game information storage medium. The game information storage medium stores in a first game machine, a game program for a second game machine having an architecture different from the first game machine architecture and an emulator program for converting the second-game-machine game program to be executed on the first game machine. By executing the second-game-machine game program on the first game machine, a game can be enjoyed on the first game machine which would not otherwise have been possible.

BACKGROUND AND SUMMARY OF THE INVENTION

The conventional game system is typically structured such that it includes a game information storage medium such as a cartridge incorporating a semiconductor memory (ROM) or an optical storage medium such as CD-ROM, and a game machine main body (e.g., a home-based video game machine or portable game machine) on which the game information storage medium is removeably loaded. The game information storage medium stores a game program configured with instructions dependent upon an architecture of a central processor unit (CPU) or graphics processor unit (graphic IC; GPU) incorporated in the game machine loaded with the game information storage medium. The game machine (e.g., a second game machine which has a lesser processing capability than a first machine) includes a CPU or the like to sequentially execute various instructions based on a game program stored in the game information storage medium. The game machine includes a processing system which performs operational processing (VI-V3) due to an operating CPU and graphics processing (V4-V6) due to an graphics processing unit, e.g. as shown in FIG. 23. Thus, image representation and/or sound processing is realized for a game as determined by the game program, being provided for play by the player.

Recently, computer technology advances have improved the processing speed and/or processing capability of the CPU, etc. There is a tendency among game machine makers toward developing and marketing the game machines incorporating a CPU, etc. using a new-type architecture matched to the needs and advancements of the times. In such game machines, once a newer-type game machine (superior machine) is released, the game program for use on the older-type game machine (inferior machine) released in the past, in general, is no longer usable on the superior machine.

Typically, when a user uses respective game programs for the inferior and superior machines, it is required that the inferior-machine game program be played on the inferior machine and the superior-machine game program be played on the superior machine. Whenever playing a game program for different models, labor and time is required to change the connection between the game machine, the television receiver and the power supply, thereby creating inconvenience for the user. Also, the newer game machine (superior machine) includes more sophisticated functions as compared to the older game machine (inferior machine) and hence requires enormous cost and time in developing game programs to achieve such functions. It has heretofore been difficult to release new game programs in a comparatively brief time immediately after a game machine's release. Due to this, there are less game programs available immediately after the release of the new model game machine, resulting in inconvenience for the user.

In order to make the inferior-machine game program usable on the superior machine (secure upward compatibility), the superior game machine must incorporate CPUs for these two machines, i.e. a CPU for the superior machine (for both operational processing and special purpose graphics processing) and a CPU for the inferior machine (for both operational processing and graphics processing). This, however, greatly increases manufacturing costs for the main body of the superior game machine and hence is impractical.

Another possible method of making the inferior-game machine (different model) game program usable without complicating the superior-machine hardware structure, is to implant an inferior-machine game program into a superior machine. However, the program implantation method requires a considerable time of development, thus incurring significantly expensive development costs for each version. Due to this, unless a popular game program is expected to generate considerable sales, it is a practice not to implement program implantation onto different model game machines. Moreover, it is often the case that implantation is difficult to realize.

Therefore, it is an advantage of the disclosed exemplary embodiments of the present invention to provide a novel game information storage medium and game system using the game information storage medium.

Another advantage of the disclosed exemplary embodiments is to provide a game information storage medium convenient for a user or player with a game program for an older-type game machine (inferior machine) that can be used even on a superior machine without the necessity of large increase of manufacture cost for the game machine adopting a recent, more sophisticated-type architecture (superior machine), and a game system using the game information storage medium.

Another advantage of the exemplary embodiments is to provide a game information storage medium and game system which can use game program for an already-released older-type game machine having a different architecture without the necessity of implanting a program for adaptation to a recent-type game architecture, thereby supplying an older-type game program to a player at low cost without requiring program-implantation cost for the game program maker.

Still another advantage of the exemplary embodiments is to provide a game information storage medium and game system where a game program already released for an older-type game machine and game program for a newer-type game machine can both be accommodated, for supply, within a common information storage medium so that game play is possible with the inferior-machine game program or superior-machine game program without the necessity of exchanging the storage medium.

A game information storage medium according to the exemplary embodiments is a game information storage medium for a first game machine (e.g., a video game machine 20) adopting a first architecture, and includes a game program, an emulator program and a game selection program. More specifically, the game information storage medium (DVD 30) stores at least one game program (321-32n) for a second game machine having a second architecture different from the first architecture of the first game machine; at least one emulator program (33) which emulates the second game machine in the first game machine so as to make the game program for the second game machine executable on the first game machine; and a game selection program (31) which displays a game title of the game program to be selected by a player. Therefore, when the game information storage medium is started-up in the first game machine, the game selection program is executed so that the player can select a desired game title, and the game program of the selected game title is executed based on the emulator program.

In preferred embodiments, the game information storage medium includes at least two game programs, and the game selection program prompts the player to select any one of the game titles of the game programs, and starts execution of the game program of the selected game title based on the emulator program.

Another game information storage medium includes at least two emulator programs which respectively emulates two kinds of second game machines having architectures different from each other and the architecture of the first game machine. The game selection program selects any one of the emulator programs in correspondence to the game program of the game title selected by the player.

A further game information storage medium includes at least two emulator programs which emulate the second game machine in at least two kinds of first game machines having architectures different from each other. The game selection program starts the execution of the game program of the game title selected by the player based on the emulator program in correspondence to the architecture of the any one of the first game machines.

In one aspect of the exemplary embodiments, a game information storage medium includes game programs and game system emulator introduction which is used in a first game machine that includes a first processing means (CPU 22, GPU 24), a writable/readable memory means (work RAM 25) and an operating means (game controller 40 or 40a-40d) operated by a player so as to enable use of a game program written for a second game machine, which includes a second processing means having an architecture different from an architecture of the first processing means, in the first game machine. The game information storage medium stores at least a game program, an emulator program and a game selection program. More specifically, the game information storage medium stores at least one game program (321-32n) for the second game machine; at least one emulator program (33) which includes a program for converting the architecture of the second processing means into the architecture of the first processing means such that the first processing means can process the game program for the second game machine; and a game selection program (31) for displaying a game title (or other information indicative thereof) to be selected by the player, whereby the emulator program and at least a portion of the game program of the game title selected by the player are to be read-out.

In this case, the emulator program calculates data to be generated by the second processing means by utilizing a virtual register. The emulator program includes a graphics processing emulator program and an operation processing emulator program. The graphics processing program causes the first processing means to emulate a function of a second graphics processing means provided in the second game machine. The operation processing emulator program causes the first processing means to emulate a function of the second processing means provided in the second game machine.

In a given game information storage medium, the game program includes game programs for at least two kinds of second game machines having architectures different from each other and the architecture of the first game machine.

In an illustrative embodiment, the game information storage medium may further includes a preliminary program. The preliminary program is a program for outputting preliminary information indicative of an outline of a game according to the game program. When the game title is provisionally selected, the game selection program executes the preliminary program associated with the provisionally-selected game title so as to output the preliminary information, and when the game title is formally selected, the game selection program starts the execution of the game program of the formally-selected game title and the execution of the emulator program which causes the game program to be executed in the first game machine.

By way of example, "provisional selection" may be an operation such that the game title is single-clicked, and "formal selection" may be an operation such that the game title is double-clicked.

Furthermore, preferably, the preliminary program is a program for displaying an animation in which the outline of the game is demonstrated, a program for displaying a still picture image in the game, a program for displaying a sentence that explains the outline of the game, or a program for outputting the outline of the game in sound.

A game information storage medium according to another embodiment stores graphics data of a plurality of kinds of characters, a character display/selection program and a data replacement program. The character display/selection program displays the respective characters prior to the execution of the game program so as to prompt the player to select a desired character out of the displayed characters. The data replacement program replaces the graphics data read-out by the emulator program with the graphics data of the character that has been selected in advance by the player at a time that the execution of the game program is started by the emulator program and a game image based on the game program is to be produced.

A game system according to the exemplary embodiments is a game system for providing in a first game machine adopting a first architecture which executes a program stored in a game information storage medium a game for a second game machine adopting a second architecture different from the first architecture of the first game machine. The game information storage medium stores at least one game program for the second game machine; at least one emulator program which makes the game program possible to be executed by emulating the second game machine in the first game machine; and a game selection program which displays at least one game title of the game program to be selected by a player. In starting the game information storage medium, the first game machine displays the game title by executing the game selection program and causes the player to select the game title, and starts the execution of the game program of the selected game title based on the emulator program.

In a game system according to a preferred embodiment, the game information storage medium includes at least two game programs, and any one of the game programs is caused to be selected by the game selection program, and the execution of the game program of the selected game title is started based on the emulator program.

In a game system according to another embodiment, the game information storage medium includes at least two emulator programs which respectively emulate two kinds of second game machines having architectures different from each other and the architecture of the first game machine. The game selection program selects any one of the emulator programs in correspondence to the game program of the game title selected by the player.

In a game system according to a further embodiment, the game information storage medium includes at least two emulator programs which emulates the second game machine in at least two kinds of first game machines having architectures different from each other, respectively. The game selection program starts the execution of the game program of the game title selected by the player based on the emulator program corresponding to the architecture of any one of first game machines.

Another game system is a game system in which in a first game machine including a first processing means for processing a program stored in a game information storage medium, a writable/readable memory means and an operating means operated by a player, a game program for a second game machine including a second processing means having an architecture different from an architecture of the first processing means can be used. The game information storage medium stores at least one game program for the second game machine; at least one emulator program which includes a program for converting the architecture of the second processing means into the architecture of the first processing means such that the first processing means can process the game program for the second game machine; and a game selection program for displaying a game title to be selected by the player. The first processing means reads the game selection program and stores the same in the writable/readable memory means, and displays a game title of the game program based on the game selection program, and when the player selects the game title, reads the emulator program and at least a portion of the game program of the game title selected by the player and transfers the same to the writable/readable memory means, and then, executes the game program stored in the writable/readable memory means while referring to the emulator program.

In another aspect of the exemplary embodiments, the game information storage medium further includes at least one game program (32m) for the first game machine, and the first game machine directly executes the game program for the first game machine when the game program for the first game machine is selected, and if the game program for the second game machine is selected, executes the game program for the second game machine based on the emulator program.

According to the exemplary embodiments, it is possible to use a game program for an older-type (inferior) game machine even on a superior machine without incurring a large increase of manufacturing cost for the game machine (superior machine) adopting a new-type architecture. Thus, particular effects are provided, e.g. obtaining a game information storage medium convenient for a user or player and a game system using the game information storage medium.

Furthermore, a game program for an already-released older-type game machine having a different architecture can be used without the necessity of implanting a program for adaptation to a newer-type game architecture, providing an effect that the older-type game program can be supplied to the player at low cost without incurring program-implanting costs for the game program maker.

In addition, a game program already released for an older-type game machine and game program for a newer-type game machine can be accommodated, for supply or sale, within a common information storage medium, providing an effect that the user can play games for use on different models in order using inferior-machine game program and superior-machine game program without incurring the inconvenience of exchanging the storage medium.

Furthermore, by causing the player to provisionally select a game title, the outline of the game having the selected game title is indicated, and thus, the player can easily search a desired game.

In addition, by replacing the graphics data included in the game program with the graphics data of the character that the player desires, it is possible to apply a variation on the game, and therefore, the single game program can be played by the player for a long time.

Furthermore, a game program already released for a game machine adopting an old-type architecture (inferior game machine) and a game program for a game machine adopting a new-type architecture (superior game machine) can be accommodated, for supply or sale, within a common information storage medium, providing an effect that the user can play games for use on different models in order using inferior-machine game programs and superior-machine game programs without incurring the inconvenience of exchanging the storage medium.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing in detail storage data according to the first embodiment;

FIG. 6 is an illustrative view showing one example of an emulator program;

FIG. 16 is an illustrative view showing in detail list data corresponding to programs for demonstration;

FIG. 22 is an illustrative view showing a display example of a game program selection screen; and FIG. 23 is a flowchart showing a principle of conventional CPU and GPU processing.

DETAILED DESCRIPTION OF THE PREFERRED EMBODIMENTS

Figure 1:
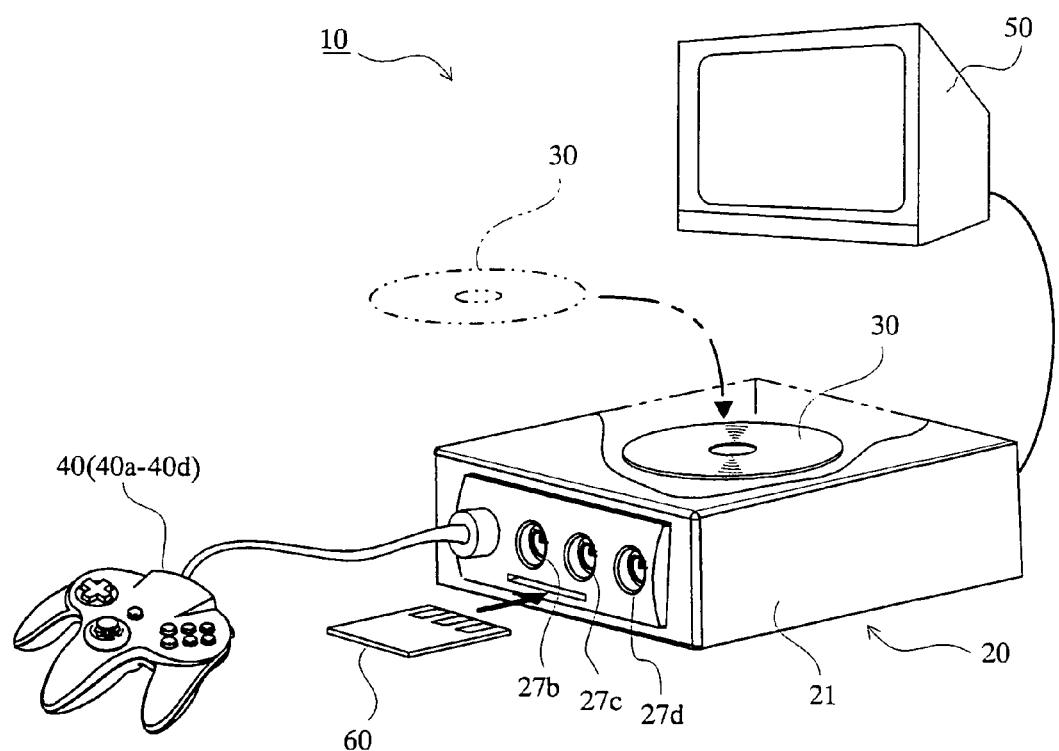
FIG. 1 is an exterior view showing a game system of one embodiment of the present invention.
Figure 2:
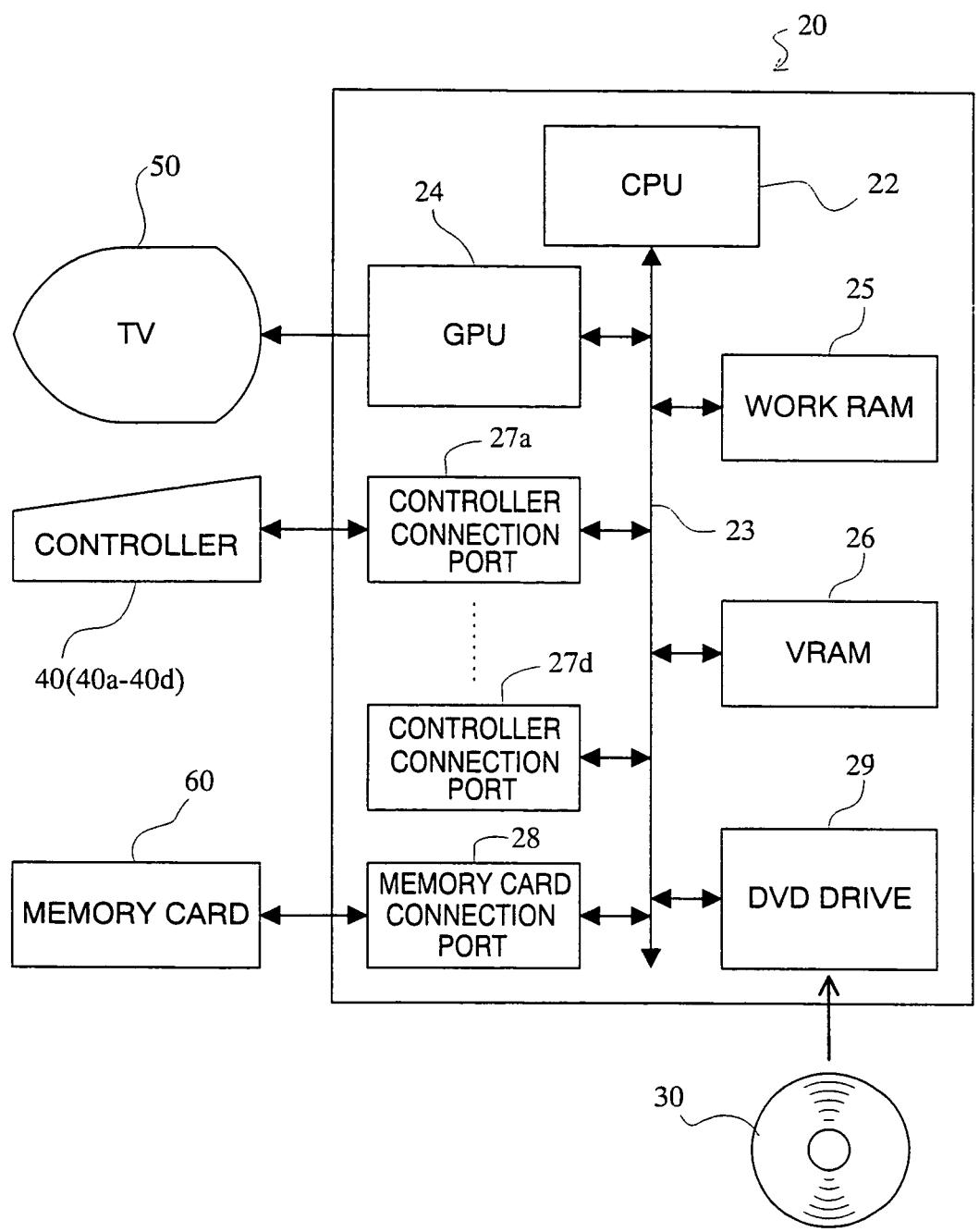
FIG. 2 is a block diagram showing FIG. 1 game system.

FIG. 1 is an exterior view of a game system, and FIG. 2 is a block diagram of the game system in accordance with one embodiment of the present invention. In FIG. 1, a game system 10 includes a video game machine 20 as one example of a superior, first game machine (e.g., with respect to processing capability) and a game information storage medium 30 detachably mounted on the video game machine 20. The game information storage medium 30 uses, for example, a large-capacity storage medium of various kinds, such as a digital versatile disk (hereinafter abbreviated as "DVD") or CD-ROM (as one example of an optical information recording medium), a high-density magnetic storage medium or semiconductor memory. The exemplary embodiment described below includes a DVD. The video game machine 20 is connected to a game controller 40 as one example of an operating means to control character (also called an object) or cursor movement for a game or an action of the character, and a home-use television receiver (hereinafter abbreviated as "TV") 50 as one example of a display device to display game images or graphics. Furthermore, the video game 20 includes a removable memory card (or cartridge) 60 to provide backup/additional storage, as required, for example, during game program execution.

In FIG. 2, the video game machine 20 incorporates a circuit board (not shown) within a main body housing 21. The circuit board includes various electronic components mounted thereon such as a CPU 22 (central processor unit), etc. The CPU 22 is connected to a graphics processor unit (graphic CPU) 24 through a bus 23, and to a working RAM (also referred to as work RAM) 25, a video RAM (VRAM) 26, a plurality of controller connection ports 27a-27d, a memory card connection port 28 and a DVD drive 29. A TV (or CRT display) 50 is connected to the graphics processor unit (graphic CPU) 24. Game controllers 40a-40d are connected to the controller connection ports 27a- 27d. A memory card 60 is detachably connected to the memory card connection port 28.

CPU 22 processes instructions using a first kind or computer architecture. The CPU 22, at start-up, controls and administers the entire game system based on an operating systems program stored within a program ROM (not shown) built into the game machine 20. When a DVD 30 is loaded on, the CPU 22 performs processing for a game based on a game program read out of the DVD 30 by the DVD drive 29. For example, based on a game program, CPU 22 controls the reading of data out of the DVD 30, writing or reading to or from the work RAM 25 or V-RAM 26, reading input data from a game controller 40a-40d, the GPU 24 and processing other than graphics processing such as various operation processes for game processing. Also, the CPU 22 receives an input signal from the controller 40a-40d through the controller connection port 28a-28d and processes a game image according to the input signal.

The GPU 24 performs processing for image display, such as geometry operation processing and rendering processing, according to an instruction received, for example, from CPU 22. The work RAM 25 stores CPU 22 operation results, etc. and stores program data read out of the DVD 30 (first or second-game-machine game program and an emulator). The V-RAM 26 temporarily stores display data to configure a game image (color data on a pixel basis), and is controlled in reading and writing by GPU 24. The memory card 29 incorporates a writable/readable semiconductor memory, such as a flash memory, to, for example, temporarily store game progress data. Data may then be read out as required after a game is interrupted to enable resuming the game from point at which is was halted (replay).

Figure 3:
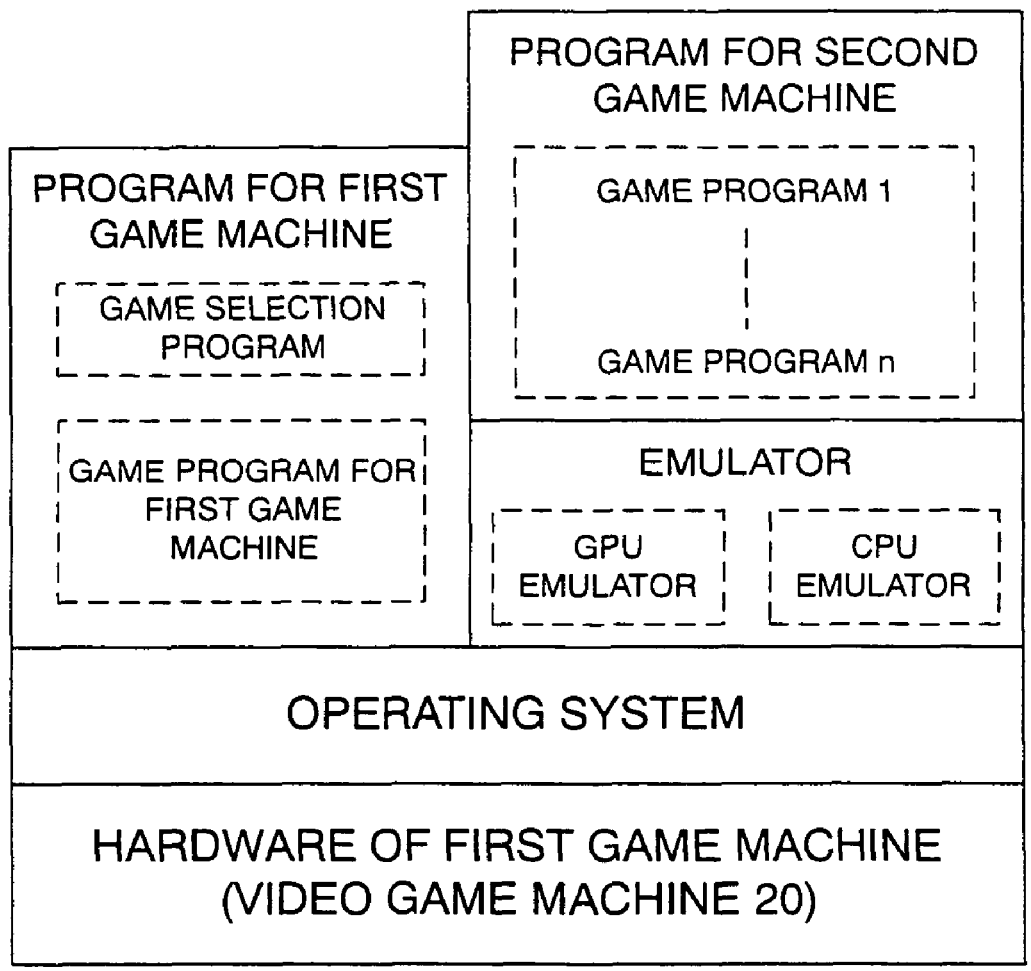
FIG. 3 is an illustrative view showing a hierarchical configuration with hardware, an operation system and various programs.

FIG. 3 is an illustrative view of a hierarchical configuration of hardware, an operating system and various programs. In FIG. 3, an operating system program stored in an internal ROM (not shown) is executed on the hardware (CPU 22) of the video game machine 20 (first game machine). When the game program read out of the DVD 30 is for the first game machine 20, a game program for a first game machine is processed using the operating system program (or by the CPU 22 through the operating system program).

When the game program read out of the DVD 30 is a game program for an older-type second game machine different in architecture from the first game machine and lower in processing capability (and/or processing speed) than that machine, the same program cannot be directly processed using the processing system for the first game machine 20. In such a case, in order to make the second-game-machine game program executable on the first game machine operation system, an emulator for converting the second-game-machine game program into a first game machine architecture is run on the operating system so that a second-game-machine game program can be run on the emulator. In this manner, the processing is made similar to that using a two-level hierarchical OS.

The relationship between the video game machine 20 (superior machine) as the first game machine and the second game machine (inferior machine; not shown) will now be explained. These machines are not compatible with respect to hardware because of differences in their architecture. For example, if the CPU of the second game machine is an 8-bit machine, a 16-bit machine or a 32-bit machine, and CPU 22 of the first game machine 20 has 64 bits, 128 bits or the like that is higher by 1 or 2 "ranks", the first game machine is by far higher in processing capability and/or processing speed than the CPU of the second game machine. In this case, if the second-game-machine game program is processed on the first game machine 20, the differences in instruction words leads to malfunction. In order for preventing this, an emulator program is employed to convert the second-game-machine game program into the software architecture for the first game machine 20. The emulator program includes, for example, an operational emulator and a graphics processing emulator. Specifically, the operation processing emulator is a program to convert the instruction words or functions to be processed by the second game machine CPU into an architecture adapted for the first game machine CPU 22. The graphics processing emulator is a program to convert the graphics processing function to be processed by a graphics processing unit of the second game machine such that it will function in the architecture adapted for the GPU 24 of the first game machine. The program for the first game machine 20 or second game machine 20 and the emulator program are read out of the DVD 30 prior to starting a game and stored in the work RAM 25.

Where the second game machine is extremely low in capability e.g. 8-bit or 16-bit CPU, and the CPU of the first game machine 20 is significantly higher in capability by 2 ranks or more, the desired results can be achieved by time-division-processing both functions of operation processing and graphics processing only on the CPU 22 without using the GPU 24 of the first game machine 20. Also, the first game machine 20 may use a high-speed computer instead of a special purpose-game machine, to execute game programs.

Various exemplary embodiments of game information storage mediums of the invention as well as game systems using the same will now be described in further detail.

[Embodiment 1]

Figure 4:
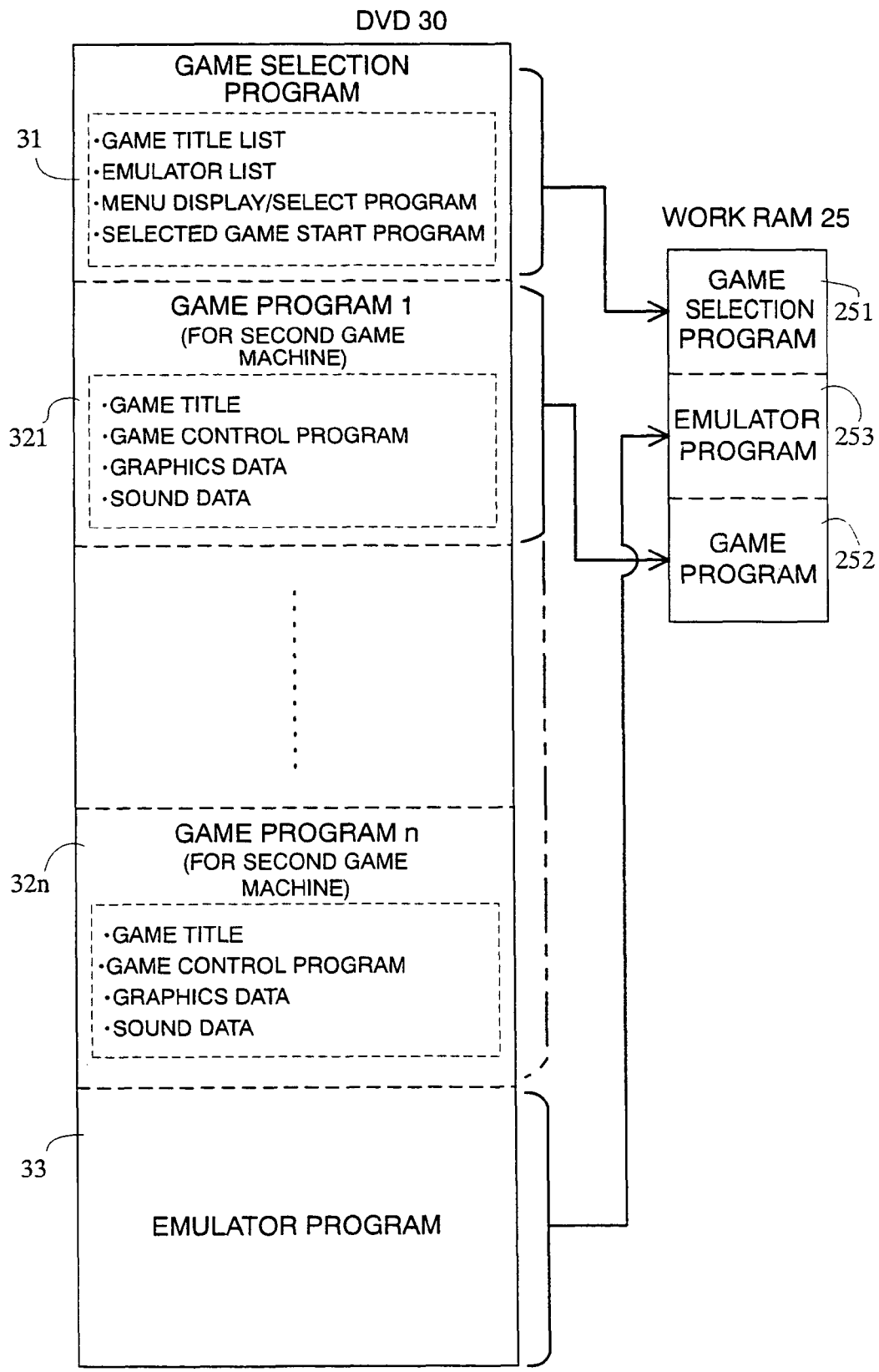
FIG. 4 is an illustrative view showing storage data on a game information storage medium 30 according to first embodiment.

FIG. 4 shows a memory map illustrating storage data on a game information storage medium (DVD) 30 according to a first embodiment. FIG. 5 is a figure showing in further detail the storage data. In this first embodiment, the game information storage medium (DVD) stores at least one or a plurality of game programs applicable for any one of the inferior, second game machines (e.g., an 8-bit FAMILY COMPUTER (NES), a 16-bit SUPER FAMICOM (SNES) and a 64-bit NINTENDO 64: All trademarks). In this example, an emulator program of one kind only is stored to convert game program architecture for the video game machine into architecture for the 128-bit machine (first game machine 20).

Figure 7:
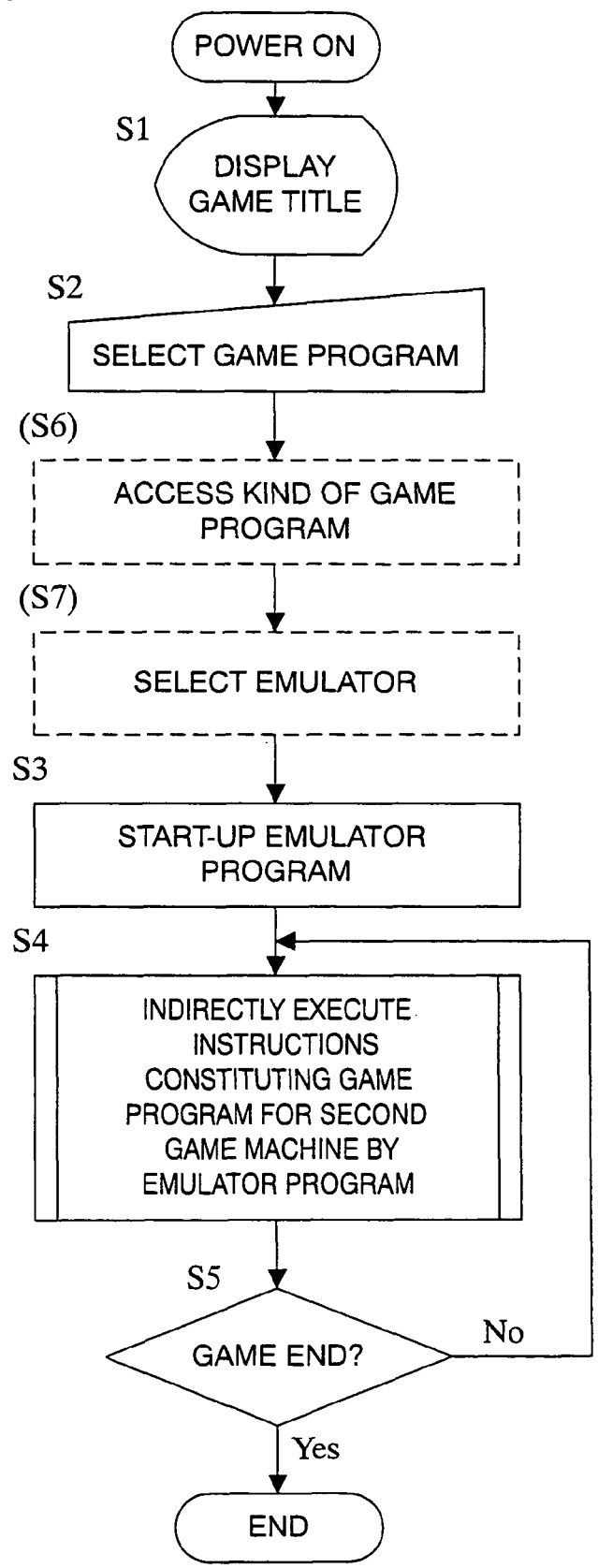
FIG. 7 is a main flowchart showing an operation of the first embodiment.

The DVD 30 includes, as shown in FIG. 4, storage areas (or recording areas) 31, 321-32n, and 33. A game selection program is stored on the storage area 31. The game selection program includes a title list of the game programs (or information indicative of game titles) for the second game machine stored on the storage areas 321-32n, a program to display a menu of recorded game titles and the like, a game selection program, etc., and as required, emulator-related information such as the kind or the necessity or non-necessity of an emulator to be applied for each of game programs. In the storage areas 321-32n, game programs are respectively stored for second-game-machine game program (game 1 to game n). The game program stored on the storage area 321-32n includes, for each game, a game title, a game control program, image displaying data (and/or graphics processing program) and sound data for sound processing (or sound program) (see FIG. 5(a)). The emulator program is an emulator program to convert the game program architecture applied on the second game machine into an architecture for the first game machine 20, and includes those for operation processing and graphics processing as required (see FIG. 5(b)). This emulator program, although hereafter described in detail with reference to FIG. 7, is to be realized, for example, by an instruction-word conversion table, etc. to convert an instruction for the second game machine into an instruction for the first game machine. Consequently, the instructions, e.g. A, D, T, . . . , included in the game control program are instructions not to be directly interpreted by the CPU 22 (and/or GPU 24). These instructions, after being converted by use of the emulator program, are first given as instructions to be processed by the CPU 22.

FIG. 6 illustratively shows one example of an emulator program. In FIG. 6, an emulation program stores a plurality of instructions for conversion and the corresponding instructions of after conversion such that, where receiving an instruction (A, B, . . . , J or K+L) constituting a game program for the second game machine, the same is converted into an instruction for the processing (a, b, . . . , j or kl) corresponding to that instruction to be executed by the CPU 22. Each time an instruction for the second game machine is given, the instruction is converted into an instruction for the CPU 22 corresponding to the received instruction and then supplied to the CPU 22, thereby emulating the instruction. Specifically, when an instruction A for the second-game-machine game program is provided, it is converted into an instruction suited for the second-game-machine game program architecture corresponding to the instruction A, thereby carrying out processing "a" corresponding to that instruction. The processing "a" may be configured by a plurality of instructions a1-a3, e.g., due to the architecture of the first game machine 20. Also, where the instruction due to the second-game-machine game program is an instruction exclusive for graphics processing (e.g. T, U), the graphics processing emulator converts it into an instruction suited for the GPU 24 architecture, according to which a processing (t1+t2+t3, etc.) is to be carried out. The detail of the processing will be described hereafter.

Figure 8:
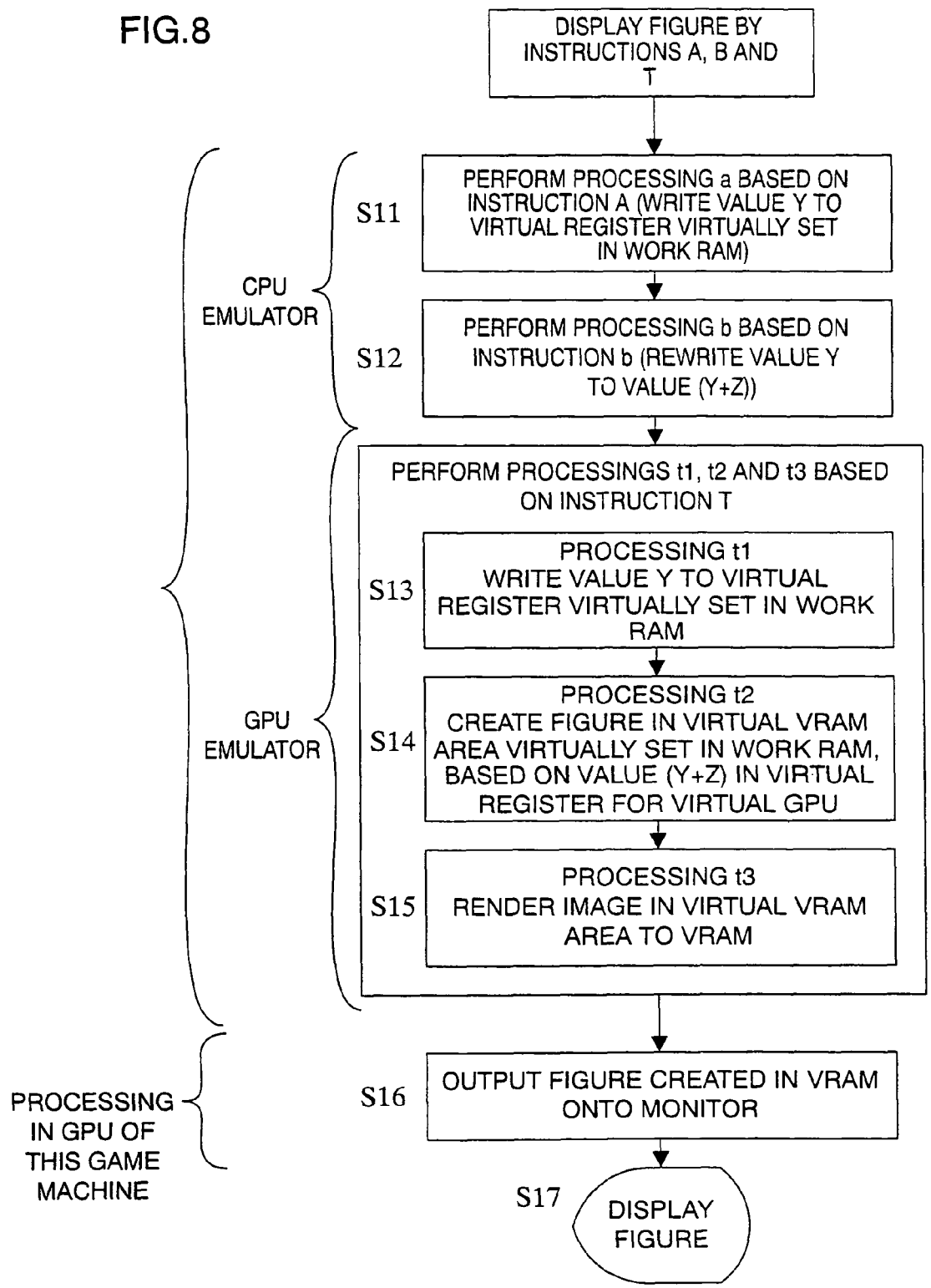
FIG. 8 is a sub-routine flowchart showing an operation of the first embodiment.

FIG. 7 and FIG. 8 are flowcharts for explaining the operation of the first embodiment. In particular, FIG. 7 shows a main routine depicting the general flow of that embodiment and FIG. 8 is a subroutine for step 4. Next, the operation of the video game system 10 of the first embodiment along with the flowcharts shown in FIG. 7 and FIG. 8 is explained.

Figure 9:
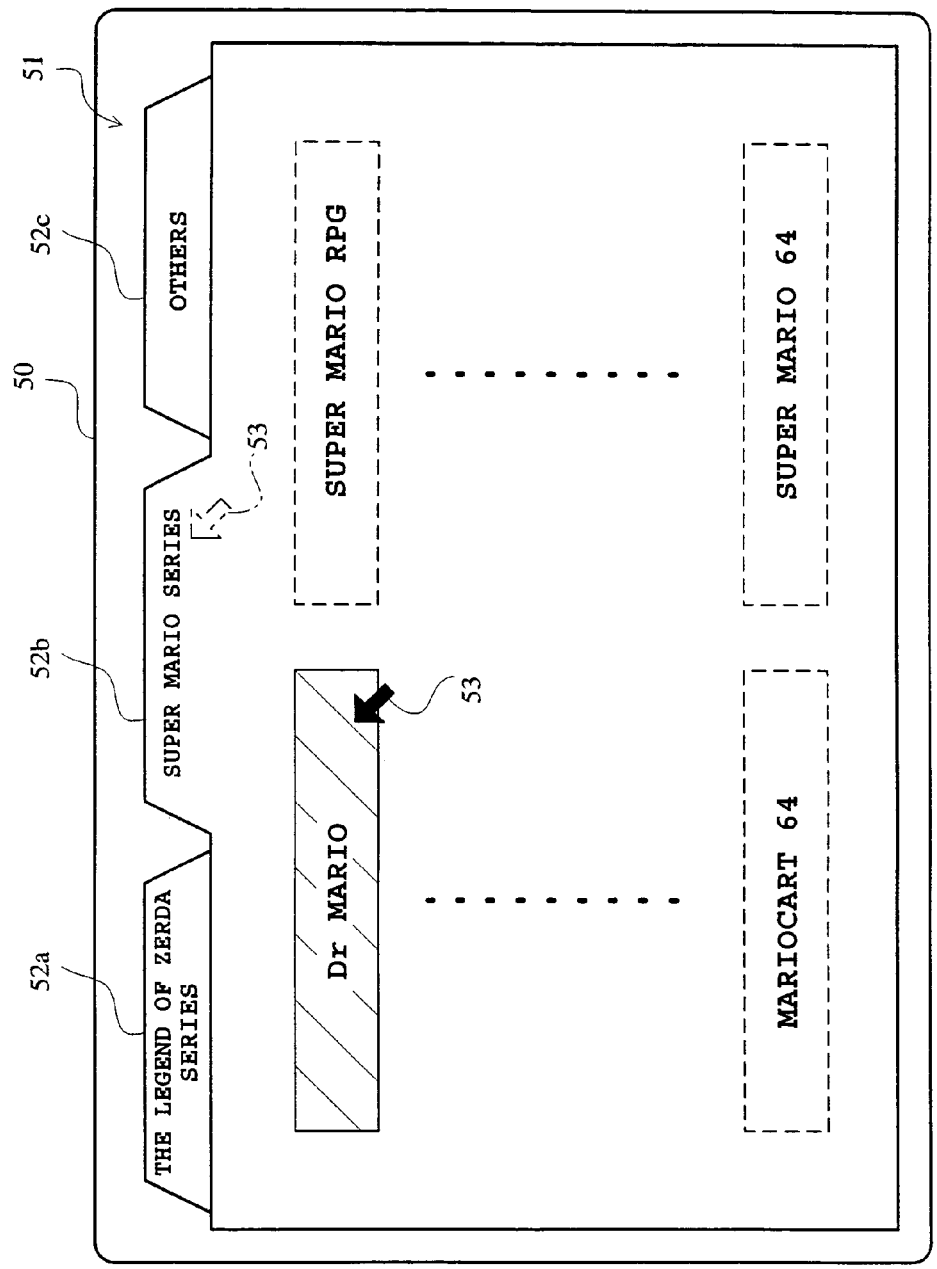
FIG. 9 is a display example showing a menu displaying screen.
Figure 10:
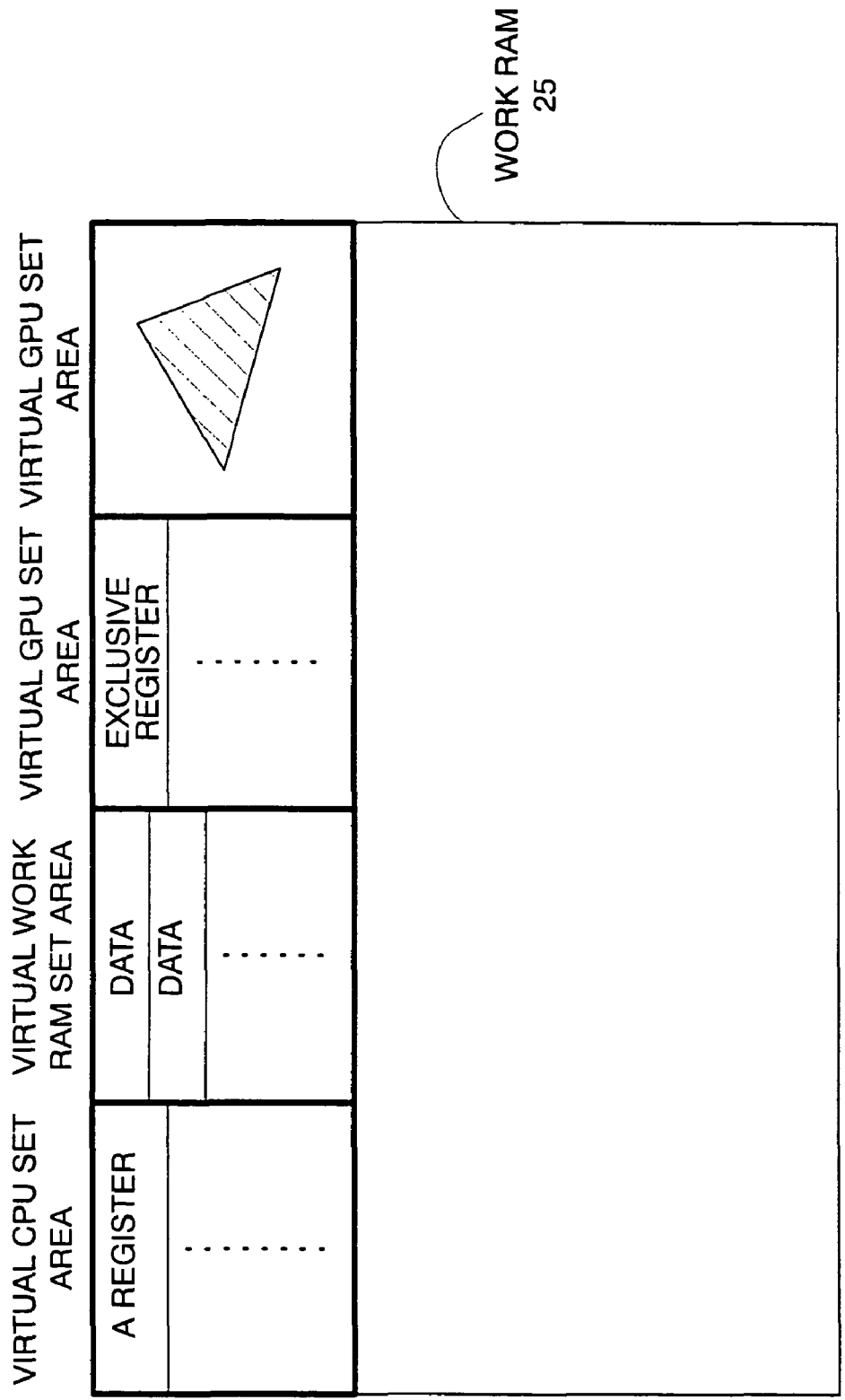
FIG. 10 is a typical view showing an inside of a work RAM.

In a step (abbreviated as a symbol "S" in the figure) S1, a title of the second-game-machine game program (or information indicative thereof) recorded on the DVD 30 is displayed. Specifically, the player 25 mounts the DVD 30 on the DVD drive 29 of the video game machine 20 and turns on power. In response, CPU 22 executes an operating system program stored on the ROM (not shown) and starts up the video game machine 20. At the beginning, the CPU 22 reads out a menu display/select program stored in the DVD 30 and writes it to a storage area 251 of the work RAM 25, thereby executing the menu display/selection program on the work RAM 25. This displays titles of a plurality of ones of game program stored on the DVD 30 based on game list data contained in a game selection program. For example, a game program selection screen 51 is displayed on a display screen of a television 50, as shown in FIG. 9. The game program selection screen 51 is, preferably, structured using a plurality of (three in the embodiment) layered screens 52a-52c separately provided on a series-by-series basis of game program. The layer screens 52a-52c have a tag to select the screen. A series name indicative of a game program is displayed on the tag. These game programs are, for example, game programs for an older-generation video game machine (second game machine) different in architecture from and lower in processing speed than the first game machine 20.

In a step S2, a game program selection process is performed. Specifically, a cursor 53 controllable by the game controller 40 is displayed on the game program selection screen 51. The player selects a desired game title by operating the cursor 53 while viewing the menu screen. That is, the player clicks a tag of a desired series name to select an arbitrary series of a layer screen 52a-52c, and then clicks an arbitrary game title of the series to select a desired one of game program.

In a step S3, the selected game title is recognized by a selected-game starting program. A selected game program is read out of the DVD 30, and transferred to the work RAM 25 and written to the storage area 252. In this case, when the selected game program stored on the game program storage area 252 has a program capacity greater than a capacity of the game program storage area 252, a part of the game program is read out, e.g. reading out is appropriately divided in accordance with game progress. In association with reading out of the game program, an emulator program (X) related to the game title is automatically read out and written to the emulator storage area 252. Thereafter, the emulator program is started up by the CPU 22.

In a step S4, the CPU 22 executes the selected second-game-machine game program using the emulator program. In the emulation process of this case, as was explained with reference to FIG. 6, the emulator program accesses an instruction the game program is to execute and performs processing operations according to that instruction, thereby indirectly executing a game program for the second game machine. This realizes, on the video game machine 20, a game based on the game program for the second game machine. The operation of step S4 is repeated until reaching game over or a game clear condition as determined at step S5, the details of which will be described later with reference to FIG. 8.

Now, explanation will be made in detail on the processing of the second-game-machine program to be executed by referring to the emulator program, with reference to a FIG. 8 subroutine.

In order to facilitate understanding the processing, explanation is made by relating the CPU and GPU processing of the conventional second game machine shown in FIG. 23 to the processing by the emulator program of the exemplary embodiments. In the conventional system, when displaying a figure such as a game character, object or the like by the second game machine, the CPU of the second game machine has executed instructions A, B (VI-V3) and thereafter the GPU has executed processing (V4-V6) based on an instruction T. It is herein assumed for the CPU of the second game machine that the instruction A is an instruction to write a value Y to an A register of the CPU, the instruction B is an instruction to add a value Z to the A register of the CPU, and the instruction T is an instruction to cause the GPU of the second game machine to perform processing of before displaying a figure based on a value of the A register.

The emulator program allocates, in the work RAM 25 of the video game machine 20, a virtual setting area to virtually reproduce for the CPU and GPU (second processing means) of the second game machine or the work RAM and VRAM included in the second game machine. For example, a virtual CPU setting area is allocated, in a predetermined address, a virtual register, etc. corresponding to each register incorporated in the CPU of the second game machine. Due to this, a virtual A register corresponding to a particular register (A register in one example) of the CPU of the second game machine is set in a particular address of a storage area in the work RAM 25. When there is processing to the A register of the CPU of the second game machine, the CPU 22 accesses the virtual A register in the predetermined address set in the work RAM 25 thereby emulating the function of the CPU and GPU of the second game machine. Emulation is similarly made for the second game machine GPU, work RAM, V-RAM and so on.

First, in a step S11, in order to execute a program to display a figure, the emulator program reads out an instruction A in the program and performs a processing operation corresponding to the instruction A. Specifically, the emulator program (CPU emulator) writes a value Y to a virtual A register having a particular address allocated in the work RAM 25 and corresponding to the A register of the CPU of the second game machine. This processing a is executed by instructions a1, a2 and a3 executable directly by the CPU 22.

In a succeeding step S12, an instruction B is read out and the corresponding processing b is carried out. Specifically, the CPU 22 reads out the value Y stored in the virtual A register and calculates a value (Y+Z) as a value Y added with a value Z. Then, the value (Y+Z) is written again to the virtual A register.

Furthermore, in steps S13, S14 and S15, an instruction T is read out and the processing t1, t2 and t3 corresponding to the instruction T are made in the order. This instruction T is to cause the CPU of the second game machine to deliver a value of the A register to the GPU of the second game machine so that the GPU can makes processing to render a figure. Specifically, the CPU 22 makes the following processing based on the GPU emulator program. That is, the processing t1 is first executed to thereby read a value (Y+Z) out of the virtual A register of the work RAM 25. The value (Y+Z) is written to an exclusive register in the virtual GPU setting area. Next, the processing t2 is executed to thereby perform operation processing, e.g. geometry operation, based on the value (Y+Z) written on the exclusive register. Due to this, figure data is produced in the virtual VRAM area corresponding to the VRAM of the second game machine. Furthermore, the processing t3 is executed to thereby produce a figure in the V-RAM 26 based on the figure data in the virtual VRAM area. Then, the CPU 22 instructs the GPU to render the figure. The GPU 22 produces an image based on the figure in the V-RAM and outputs the image data onto a television (step S16). The above processing by the video game machine 20 provides, on the television 50, display of a game picture which is nearly the same as a game picture to be displayed by a game program for the second game machine (step S17). If there is input through the game controller 40, the instructions for the second-game-machine game program are sequentially read out to sequentially execute the process corresponding to the instructions. In this manner, the game program for the second game machine is made executable by the video game machine 20 having a different architecture.

This makes it possible to use a plurality of ones of game programs for the older-type second game machine on the newer-type first game machine without incurring complications in structure and cost increases of the first game machine. Also, the game program for the older-type game machine is comparatively smaller than the game program for the newer type game machine. The storage medium storing the game program for the newer-type game machine has an increased capacity greater than that for the older-type. Accordingly, it is possible to store a plurality of older-type games in a single storage medium for the newer-type game machine. Furthermore, there is an advantage of providing user-game information storage mediums at low cost

[Embodiment 2]

Figure 11:
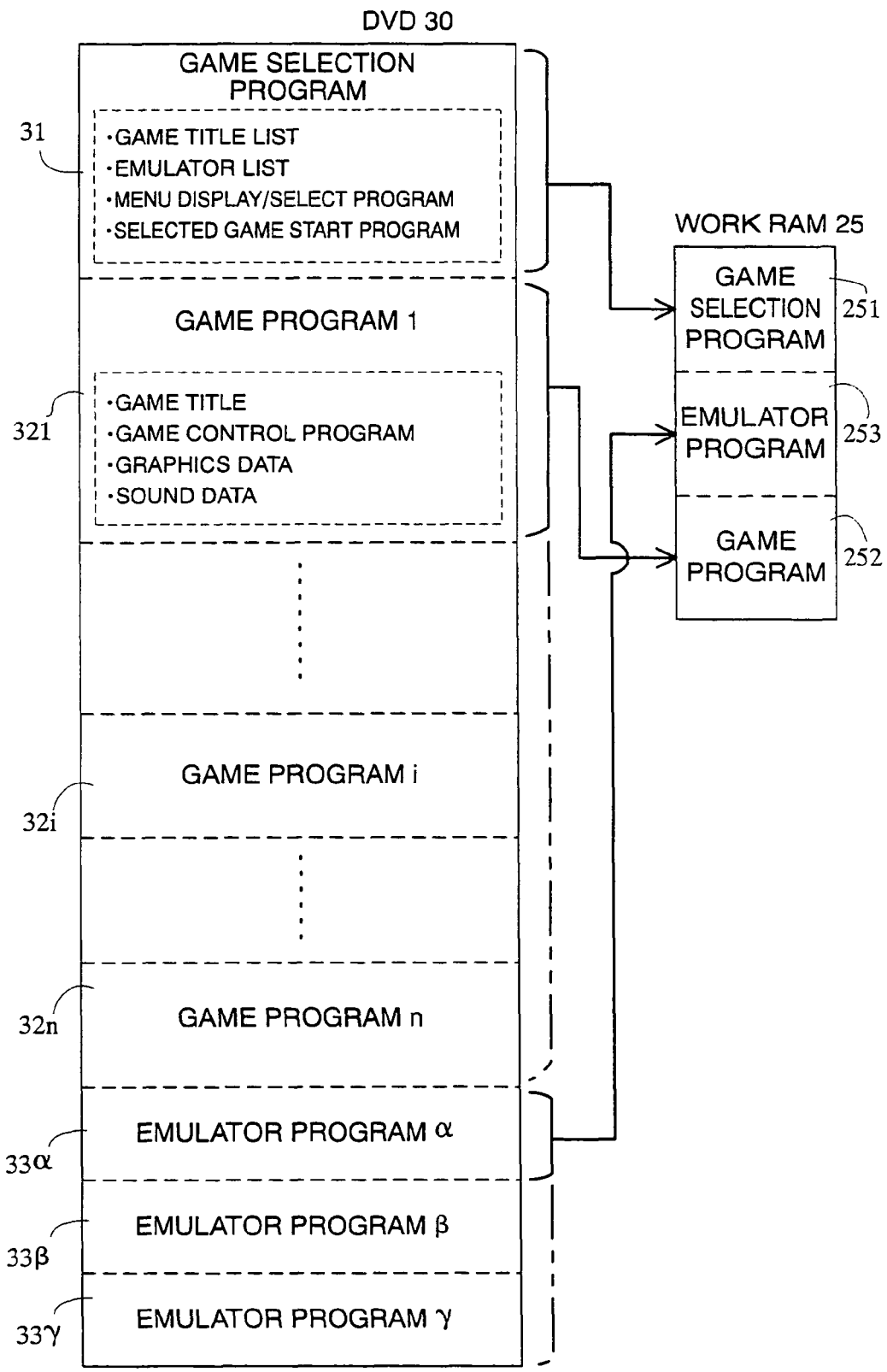
FIG. 11 is an illustrative view showing storage data on a game information storage medium according to a second embodiment.

FIG. 11 illustratively shows storage data on a game information storage medium (DVD 30) according to the second embodiment. The second embodiment is different from the first embodiment (FIG. 4) in that the game information storage medium (DVD) stores a plurality of game programs (game 1 to game n) to be applied to any of at least of two kinds of inferior, second game machines (an 8-bit machine, a 16-bit machine and a 64-bit machine, in an example of the video game machines marketed by the applicants' assignee, Nintendo). This example stores emulator programs in a number dependent upon the number of the inferior machine models (at least two kinds α and β, where α is an emulator to convert 16-bit one into 128-bit one and β is an emulator to convert 64-bit one into 128-bit one) to convert game program architectures for at least two kinds of game machines into an architecture for the superior first game machine 20.

The DVD 30 has at least two kinds of emulator programs (α, β) stored in storage areas 33α, 33β, in addition to the storage data of FIG. 4, as shown in FIG. 11. Furthermore, a game selection program, as shown in FIG. 12, stores the kinds of emulators (for three in kinds, α, β, ν) to be used in executing on the first game machine a game corresponding to a game title.

Figure 12A:
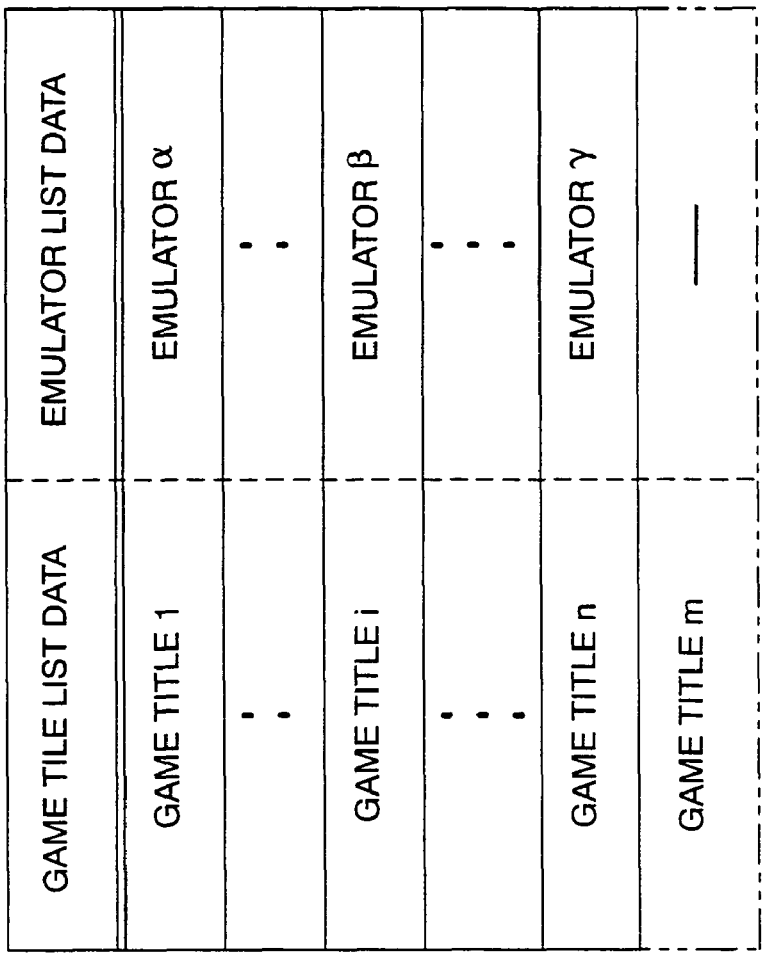
FIG. 12A is a functional block diagram of an example game selecting program.

Next, explanation follows for a case of processing a game using the DVD 30 storing information or programs as in the second embodiment as shown in FIG. 11 and FIG. 12. The processing in this case is to be achieved by additionally processing steps S6 and S7 in the flowchart of FIG. 7.

When a game title for a particular game program is selected in step S2, as indicated in the succeeding step S6, a game program kind is accessed. The game selection program herein includes, as shown in FIG. 12 (A), game title list data, emulator list data (emulator identifying data), a menu display/select program and a selected-game start program. The game title list data is letters to display all the game titles of the game programs. The emulator list data is a list of emulator programs in kind corresponding to the game titles.

Figure 12B:
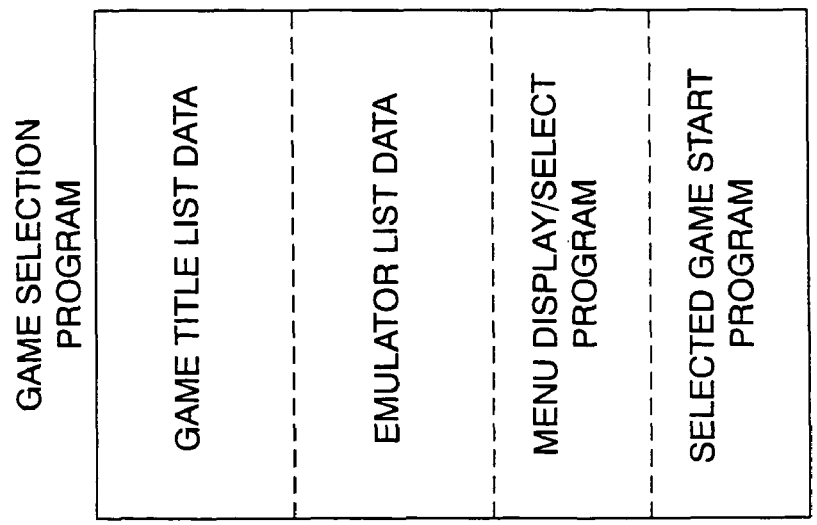
FIG. 12B is a block diagram of an example program stored list for correlating different emulator programs to corresponding game tides.

The game title list data and the selected-game start program have already been explained and further explanation is omitted. The game title list data and the emulator list data are stored by providing the relation to an emulator in kind required to execute the game program on a game-title basis, as shown in FIG. 12(B).

When a player selects for example a game title 1, in step S6 a game program kind of the game title 1 is accessed. In the succeeding step S7 determination is made based on emulator list data corresponding to the game title in order to determine an emulator in kind to execute the game program for the selected game title 1 (see FIG. 12(B)). As a result, selected is an emulator program for an emulator α corresponding to the game title 1. Thereafter, operation is made similarly to the above steps S3-S5 whereby the game program for the game title 1 is executed based on the emulator program of the emulator α. In this manner, processing steps S1, S2 , S6, S7, S3 ,S4 and S5 makes it possible to play on the video game machine 20 a game program selected for a plurality of kinds of second game machines different in architecture from the video game machine 20.

This makes it possible to record and store, on one DVD 30, a series of game programs developed for the 8-bit machine, the 16-bit machine and the 64-bit machine different in architecture (e.g. Super Mario 1, 2 and 3 for the 8-bit machine, Super Mario World for the 16-bit machine, and Super Mario 64 for the 64-bit machine: all the trademarks). The series of game programs for different models can be played on the common first game machine 20 by merely selecting game titles. There is no need of exchanging hardware or platform, connection to the TV and game information storage medium. The user can remember game rules in order while enjoying earlier released older series games. Thus, it is possible to prevent the feeling of sudden rise in difficulty level in using a new platform as compared to the case of immediately playing game for the newest game machine, providing the advantage of enhancing stepwise the difficulty level, the game clear rate for all of the series and satisfaction by the user.

[Embodiment 3]

Figure 13:
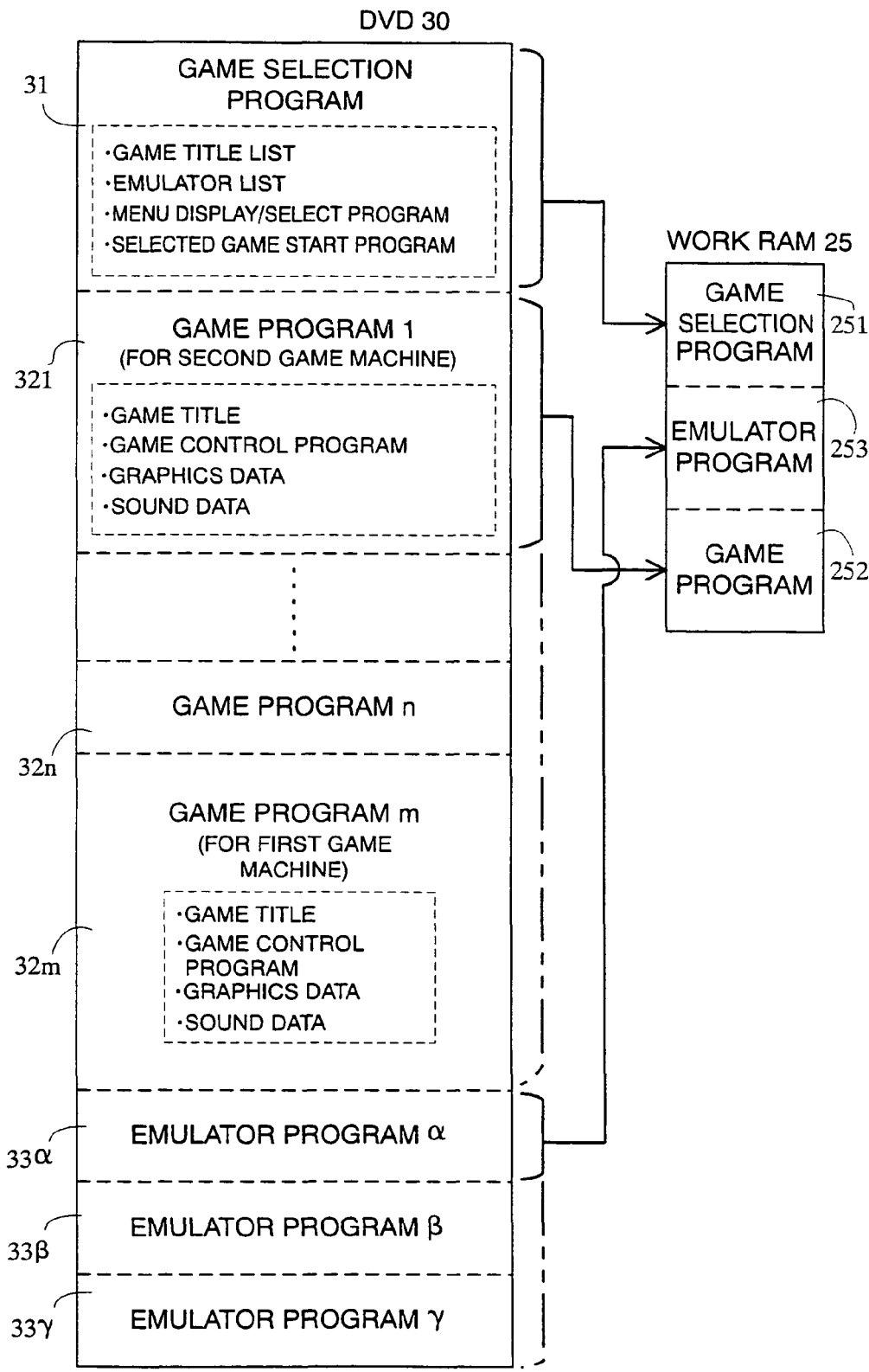
FIG. 13 is an illustrative view showing storage data on a game information storage medium according to a third embodiment.

FIG. 13 illustrates storage data on a game information storage medium (DVD) 30 according to a third embodiment. In the third embodiment, a game information storage medium (DVD) stores at least one game program (in the case of plurality, game 1 to game n) to be applied to one kind second game machine (in the example of marketed by the present applicants' assignee, Nintendo, any one model of the 8-bit video game machine, the 16-bit video game machine and the 64-bit game machine), an emulator program in one kind to convert the game program architecture for the second game machine into an architecture for the first game machine 20, and at least one game program inherent to the first game machine.

The DVD 30 has a game selection program stored in a storage area 31 similar to FIG. 4, at least one game program for the second game machine stored in a storage area 321, and an emulator program stored in a storage area 33, as shown in FIG. 13. Furthermore, at least one game program for the first game machine is stored as storage information particular to this embodiment in a storage area 32m. The game program for the second game machine may store a plurality of ones of game programs. In such a case, as in the second embodiment, a plurality of ones of game programs different in kind for the second game machine may be stored and emulators in kind corresponding to the kind of them be stored.

Figure 14:
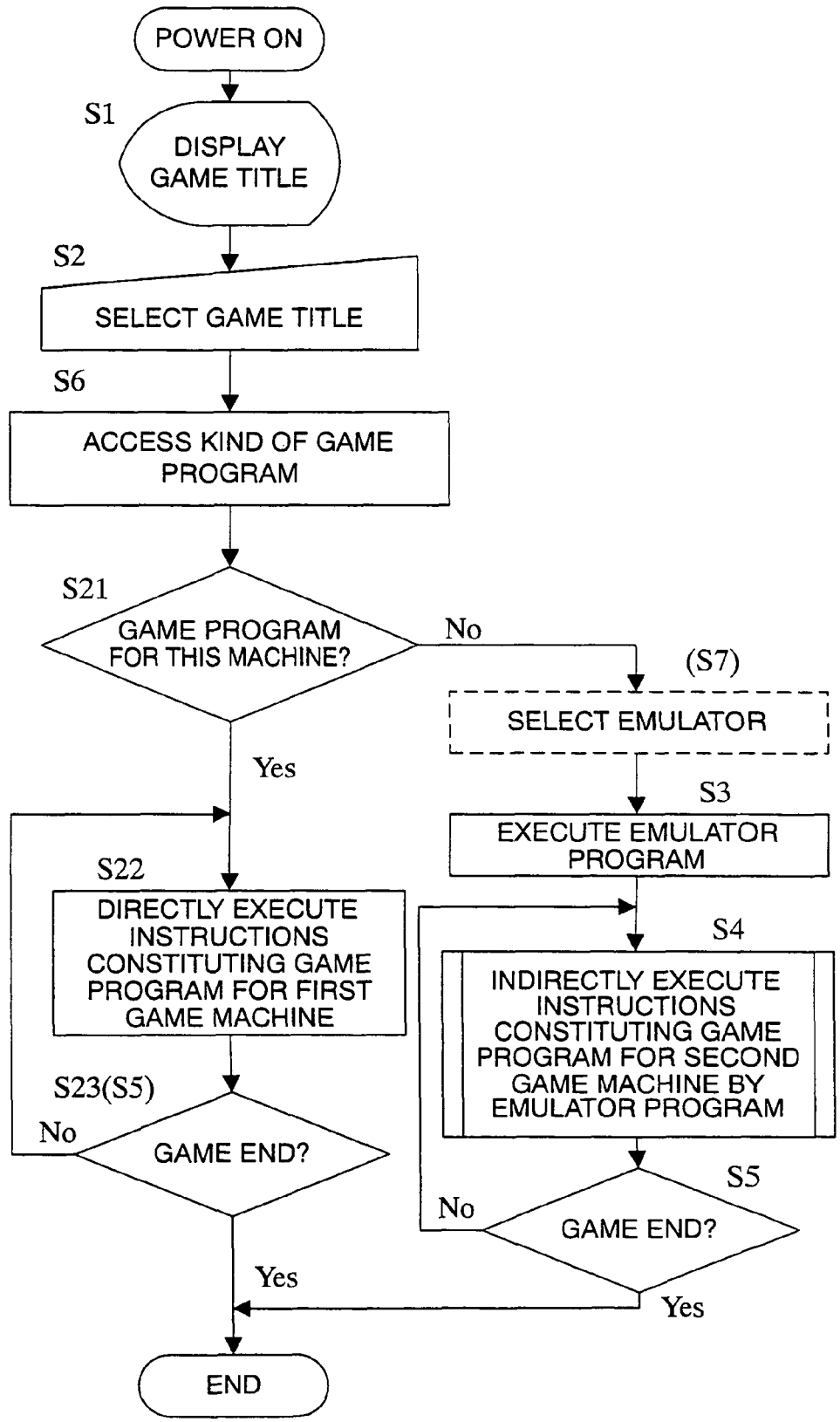
FIG. 14 is a main flowchart showing an operation of the third embodiment.

FIG. 14 is a flowchart for explaining the operation in the third embodiment. Next, explanation is made on the operation of this embodiment with reference to FIG. 13 and FIG. 14. In FIG. 14 duplicated portions with those of the FIG. 7 flowchart explained before are given the same symbols, omitting explanations thereof. Also, the step S7 in FIG. 14 is shown by the broken lines, which show that the step be omitted for a single emulator program case.

As shown in FIG. 14, a game title desired by a player is selected by steps S1, S2 and S6. In the case that a selected game has a game title (m) for the first game machine 20, the processing shown in step S21-S23 is carried out. On the other hand, where the selected game title is on the game program for a game machine other than the first game machine 20, the processing shown in steps S7, S3, S4 and S5 is performed.

Specifically, if in step S6 a game title (m) for example is selected, the CPU 22 determines that the game program with that game title does not require an emulator (see the lowermost column in FIG. 12(*b*)). In response, it is determined in step S21 that game program for the first game machine 20 was selected, and the process advances to step S22. In step S22, the CPU 22 and/or GPU 24 directly execute (execute without using an emulator) each instruction of the game program with the game title (m). In step S23, it is determined whether the game is over or cleared or not. The operation of the step S22 is repeated until any game ending conditions are detected. Where there are plurality of ones of game programs for the first game machine 20, the above steps S1, S2, S6, S21, S22 and S23 are similarly supplied.

If a game title for the second game machine is selected in step S2, a game program kind is accessed for the selected game title in step S6, thus determining that the game is a game requiring an emulator (see FIG. 12(*b*)). In response, in step S21 determination is made that the program for the first game machine 20 requires an emulator, and the process proceeds to step S7. In step S7, where there are a plurality of emulators, an emulator kind is selected and in step S3 an emulator program is executed. However, where there is a single kind of an emulator, the process directly advances to step S3.

Thereafter, the steps S4 and S5 are processed. However, the operation of steps S3 to S5 or S7 is similar to that of FIG. 7, detailed explanation thereof is omitted.

This makes it possible to play with comparison between the game program for the older-type (inferior) second game machine and the game program for the newer-type (superior) first game machine, thus providing the advantage of allowing enjoyment of a game with a feeling of improvement of performance over the first game machine.

[Embodiment 4]

Figure 15:
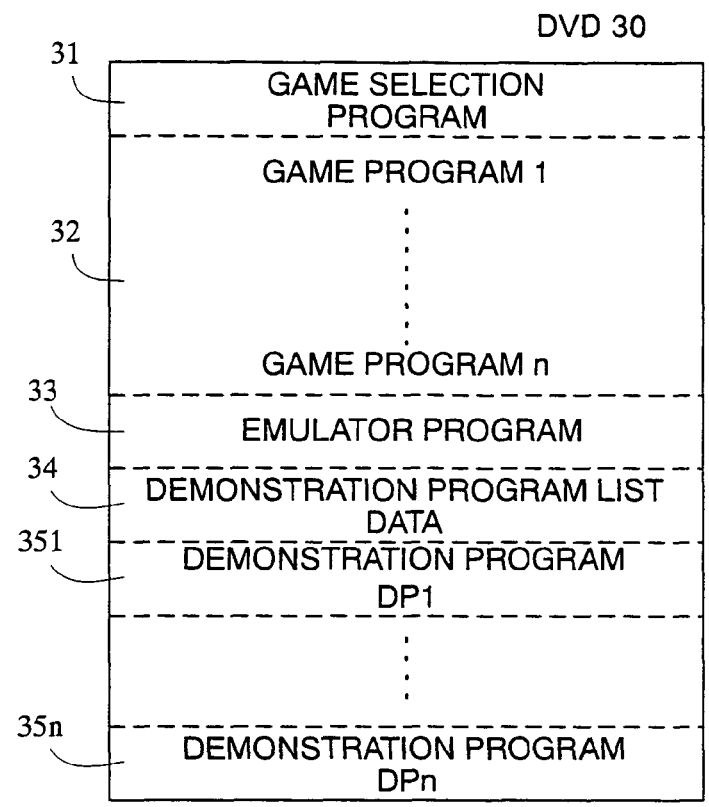
FIG. 15 is an illustrative view showing storage data on a game information storage medium according to a fourth embodiment.

FIG. 15 illustratively shows storage data on a game information storage medium (DVD 30) according to the fourth embodiment, and FIG. 16 is an illustrative view showing the details of demonstration program list data. In addition to the third embodiment (FIG. 13), the fourth embodiment stores on the game information storage medium 30 a demonstration program that is one example of a preliminary program showing an outline of the game according to the game program, and in selecting a game title by a player, the information showing the outline of the game of that game title is outputted and displayed. In this embodiment shown, in order to output the preliminary information showing the game outline, a case that the demonstration is displayed by an animation will be described.

Specifically, as shown in FIG. 15, the DVD 30 stores in addition to the storage data of FIG. 4 (or FIG. 11) at least the demonstration program list data in a storage area 34, and demonstration programs DP1-DPn in storage areas 351-35n. The demonstration program DP1-DPn is a program for displaying on the TV 50 connected to the game machine 20 an animation of at least a portion of the game according to the game title 1-n. Furthermore, the demonstration program list data is data in which the demonstration programs DP1-DPn are respectively associated with the game titles 1-n as shown in FIG. 16.

Figure 17:
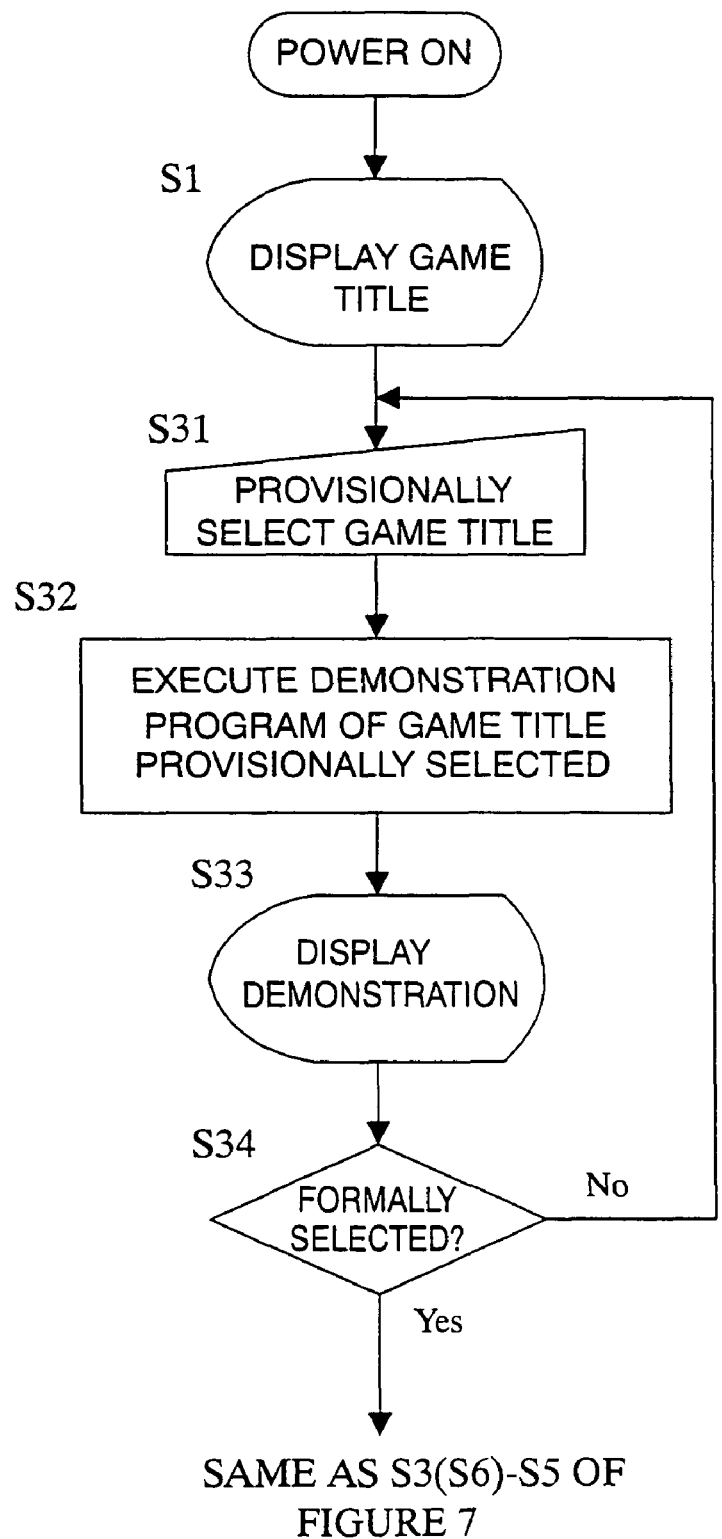
FIG. 17 is a main flowchart showing an operation of the fourth embodiment.
Figure 18:
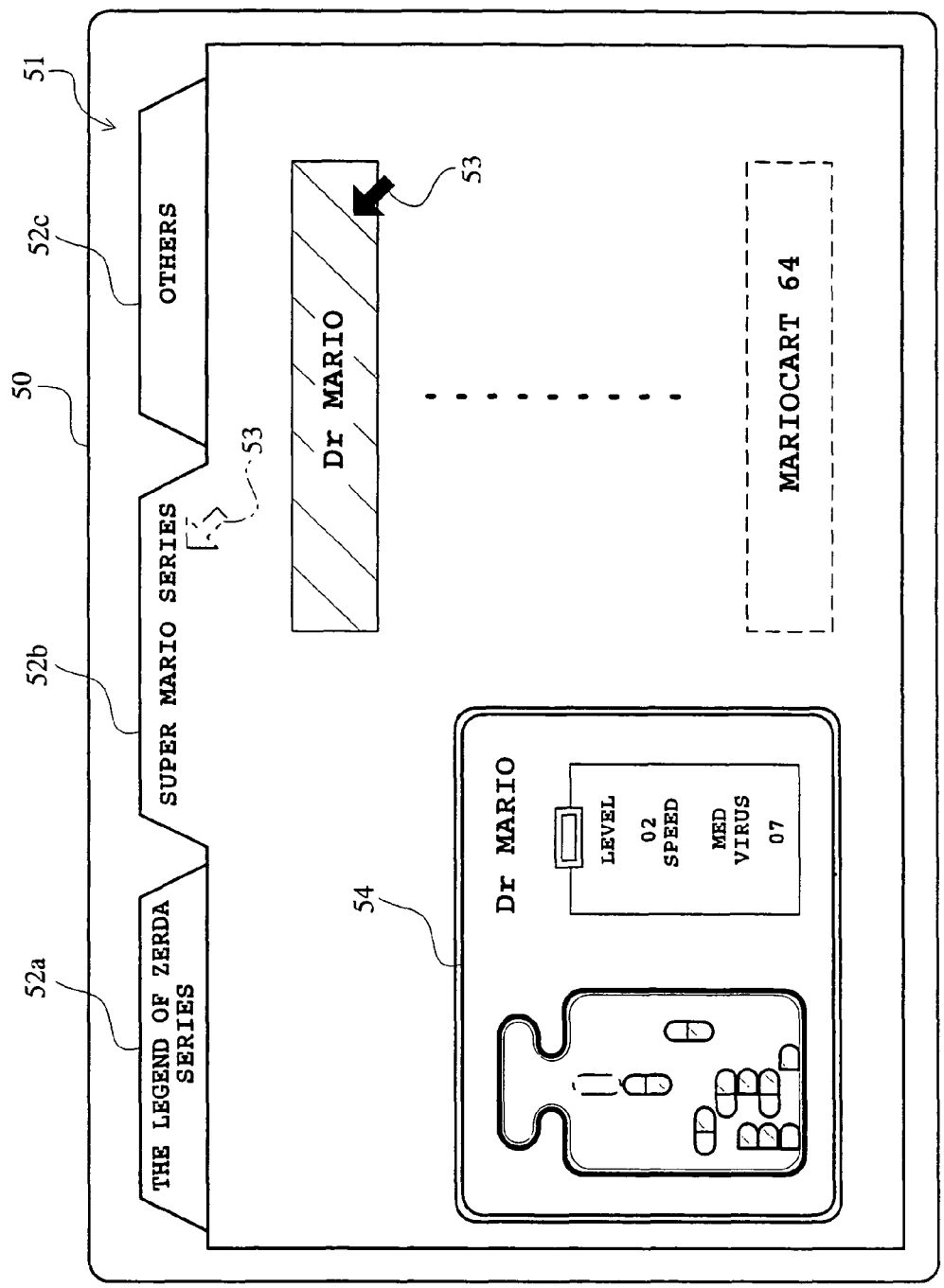
FIG. 18 is an illustrative view showing a display example of a game program selection screen.

FIG. 17 is a flowchart for explanation of the operation of the fourth embodiment, and FIG. 18 is a figure showing a game selection screen displayed in the embodiment. Next, explanation is made on the operation of this embodiment with reference to FIG. 17. In FIG. 17 duplicated portions with those of the flowchart having been explained are given with the same symbols, omitting explanations thereof.

As shown in FIG. 17, in step S1, the game selection screen shown in FIG. 18 is displayed on the TV. In order to understand the game outline of a desired game title, the player operates the cursor 53 while viewing the game selection screen so as to adjust the cursor 53 to a desired game title, and then, provisionally selects the game title (for example, single-click). In response to the provisional selection thus made, processing of the steps S31-S34 are performed, and therefore, the animation of the game title that is provisionally selected is displayed on the TV 50 as the demonstration. Then, the player who grasped the desired game title through the animation formally selects the game title (for example, double-click). In response to the formal selection, the processing after the step S3 shown in FIG. 7 are performed. On the other hand, if the player grasped that the game title is non-desired game title through the animation, further provisionally selects other game title. During such the provisional selection, steps S31-S34 are repeated.

Specifically, in the step S1, by executing the menu display/selection program of the game selection program, as shown in FIG. 18, the game selection screen 51 is displayed, and the cursor 53 is displayed on the screen. Incidentally, at this time, the demonstration screen 54 has not been displayed.

In step S31, the player provisionally selects (for example, single-click) the desired game title, for example, "Dr. Mario": hereinafter, "game title i" by the cursor 53, in response to this, in the step S32, the game selection program detects that the provisional selection was made, and references to the demonstration program list data (FIG. 16) stored in the storage area 34 of the DVD 30. The CPU 22 executes the game selection program, and based on the list data, reads the demonstration program DPi, for example corresponding to the provisionally-selected game title i, and stores the demonstration program in the work RAM 25. Then, the execution of the demonstration program DPi in the work RAM 25 is started.

In step S33, by executing the demonstration program DPi, the demonstration screen 54 is set on the game selection screen 51, and the demonstration animation of the game of the game title "Dr. Mario (trademark)" is displayed on the demonstration screen 54 (FIG. 18). In step S34, the player recognizes the animation displayed on the demonstration screen 54, and if the game is one that the player desires, formally selects the game title (for example, double-click) by the cursor 53. The game selection program detects the game title is formally selected, and then, continues processing after the above-described step S3 (FIG. 7). On the other hand, when the provisional selection is made again in the step S34, the steps S31-S34 are repeated. By doing so, the player can grasp the outline of the game for the second-game-machine game program, and therefore, it becomes for the player possible to play the desired game more quickly and more surely. In this fashion, there is the advantage that it is possible to prevent a selection error by the player where the player knew the selected game title is not the desired game after the game is started.

In addition, in the fourth embodiment, a case that as the preliminary information showing the game outline, the animation is displayed for the demonstration of the game was described, but as other preliminary information, a still picture in the game may be displayed, or a comment sentence explaining the outline of the game may be displayed. That is, instead of the demonstration program, a program including the text data of the comment or the image data of the still picture can be executed by the CPU 21. Thus, in the demonstration screen 54 of the game selection screen 51 displayed on the TV 50 connected to the game machine 20, instead of the animation, the comment sentence or the still picture can be displayed. If the comment sentence is utilized, it is possible to grasp the game outline in more detail, and if the still picture is utilized, the game outline can be grasped quickly with short time.

Furthermore, instead of the animation, it is possible to output a sound from the speaker (not shown) of the TV 50. More specifically, instead of the demonstration program, a program including the sound data is executed, whereby the outline of the game is generated from the speaker of the TV 50 in sound. In this case, there is advantage that it makes the player more easily grasp the game outline by the sound.

[Fifth Embodiment]

Figure 19:
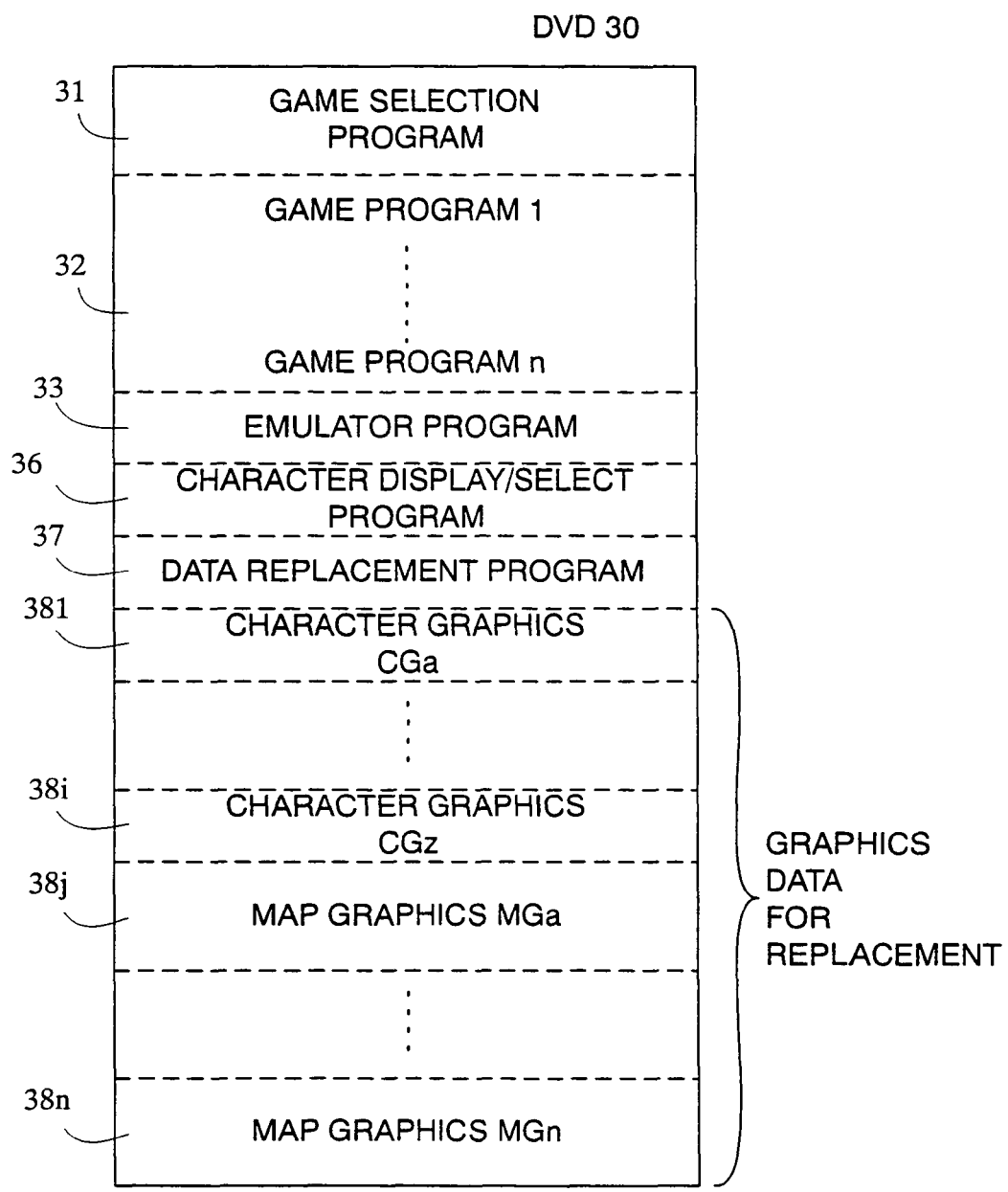
FIG. 19 is an illustrative view showing storage data on a game information storage medium according to a fifth embodiment.
Figure 20:
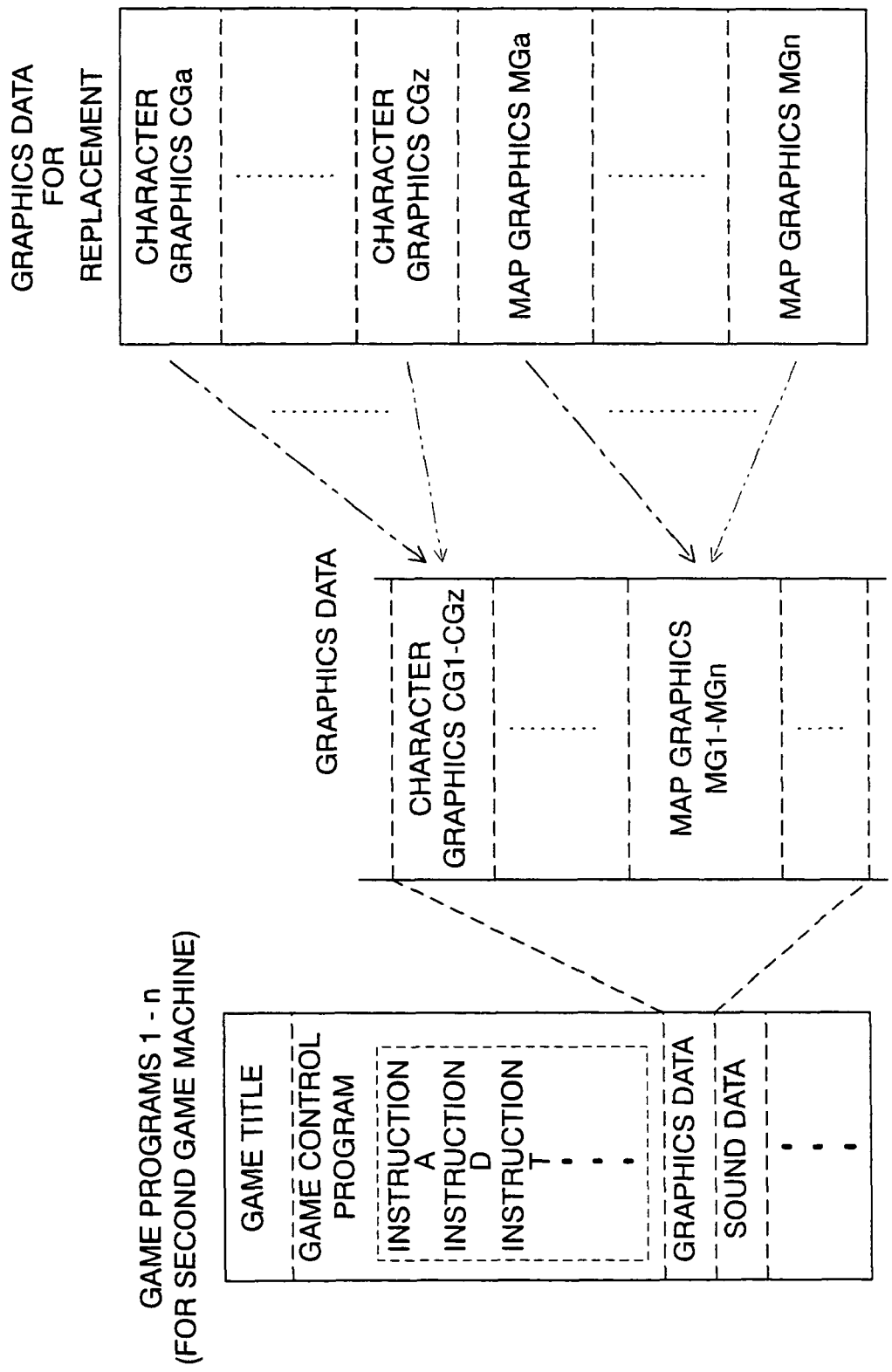
FIG. 20 is an illustrative view showing graphics data for replacement and graphics data of a game program.

FIG. 19 illustrates storage data on the game information storage medium (DVD) 30 according to the fifth embodiment, and FIG. 20 illustrates the second-game-machine game program and replacement graphics data stored in the game information storage medium in detail. In addition to the third embodiment (FIG. 13), in the fifth embodiment, a character display/selection program for displaying characters and making the player to select a desired character, and a data replacement program which replaces the character graphics data included in the game program with the character graphics data separately prepared are stored on the game information storage medium (DVD 30).

Specifically, as shown in FIG. 19, the DVD 30 stores, in addition to the storage data of FIG. 4 (FIG. 11), the character display/selection program in a storage area 36, the data replacement program in a storage area 37, and the replacement graphics data in storage areas 381-38n, respectively. Furthermore, as shown in FIG. 20(c), the replacement graphics data includes respective graphics data of the character graphics CGa-CGz and map graphics MGa-MGz. Furthermore, as shown in FIG. 20(a) the second-game-machine game program comprises the game title, the game control program, the graphics data and the sound data utilized by the game control program as described above. In addition, as shown in FIG. 20(b), the graphics data included in the game program is constructed by the graphics data of the character of the hero or heroine in the game (the character graphics CG1 and etc.) and the map graphics data (map graphics MG1 and etc.). As described later, the data replacement program replaces the graphics data of the character graphics CG1 included in the game program 1, for example with the video data of the character graphics CGa for replacement. Therefore, the player can play the game character different from the original hero or heroine character as the hero or heroine. In the description of the embodiment, the explanation is made on the hero or heroine character by way of example, but the present invention is not limited thereto, and it is possible to suitably change the map or other characters.

Figure 21:
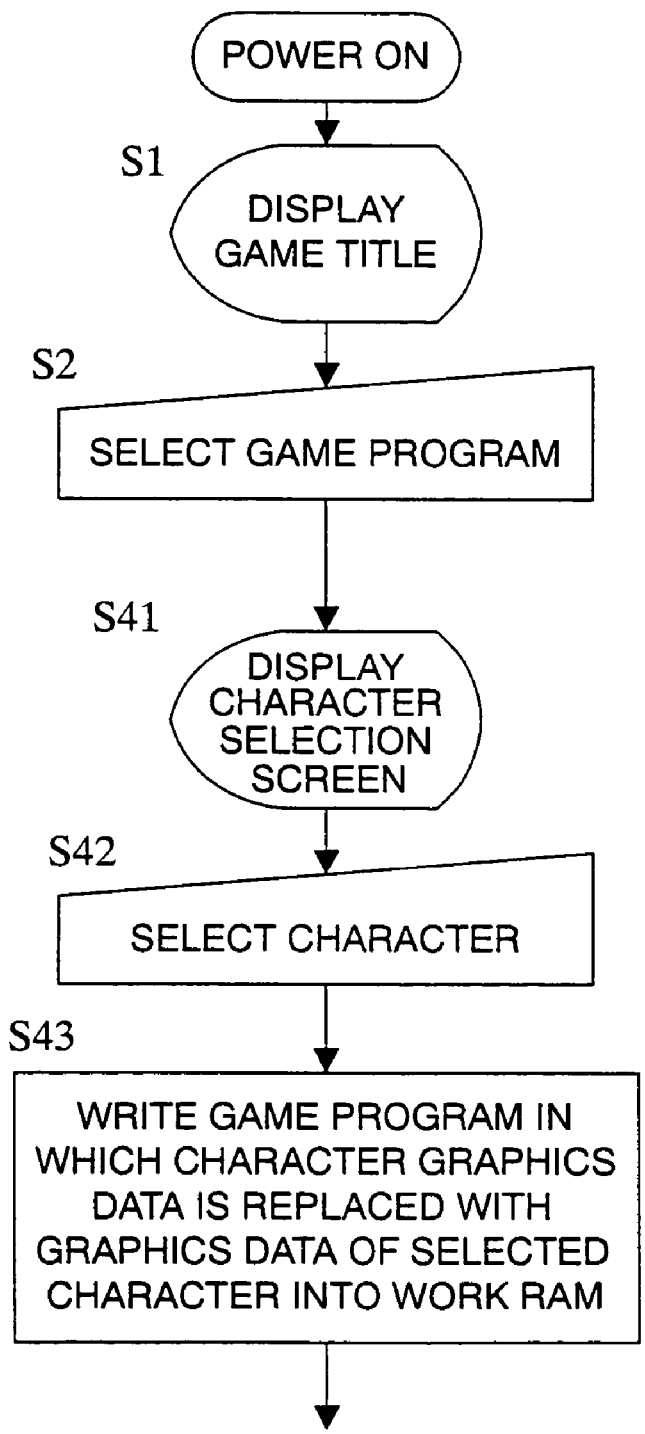
FIG. 21 is a main flowchart showing an operation of the fifth embodiment.

FIG. 21 is a flowchart for explaining the operation of the fifth embodiment. Next, the operation of this embodiment will be described with reference to FIG. 21 while applying the same symbols to the portions having been described, omitting explanations thereof.

As shown in FIG. 21, in the step S1, the game titles that can be selected are displayed. In the step S2, the game title that the player desires is selected. Furthermore, in the step S41, the characters that can be selected by the player are displayed. In the step S42, the player selects a desired character. In the step S43, the game program in which the hero or heroine character of the previously-selected game program is replaced with the selected character is generated. According to the generated game program, the processing operations shown in the steps S6, S7, and S3-S5 are performed.

Specifically, in the step S41, the character display/selection program is read from the storage area 36 of the DVD 30, and the program is written in the work RAM 25. Then, by executing the character display/selection program, the character selection screen 52d as shown in FIG. 22 is set so as to be displayed on the game program selection screen 51 as one example of a layered screen.

In the step S42, the player operates the cursor 53 and clicks the tag of the character selection screen 52d. In response to this click, the character display/selection program displays the character selection screen 52d. Then, the player moves the cursor onto the desired character name, for example, Mario, Luize, and etc. displayed on the character selection screen 52d and clicks the desired character. In response to the click of the character name, the character display/selection program grasp the character name thus clicked.

In the step S43, the data replacement program is read from the storage area 37 of the DVD 30 to be written in the work RAM 25. Then, the data replacement program is executed. The data replacement program replaces the graphics data of the hero or heroine character included in the game program with the replacement graphics data as selected in transferring the game program previously selected from the DVD 30 to the work RAM 25. Then, the game program in which the graphics data of the selected character is replaced is stored in the work RAM 25. The processing operations after the step S3, the game program stored in the work RAM 25 are executed by the emulator. The processing operations after the step S3 have been explained, and therefore, the explanations thereof are omitted here.

Thus, in the newer-type first game machine, the game program for the older type game machine can be played while the character selected by the player is the hero or heroine thereof, and therefore, the player can enjoy the older-type-game-machine game program multilaterally.

In addition, in the data replacement program of the fifth embodiment, the graphics data included in the game program is replaced at a time that the game program is transferred to the work RAM 25, but by making the data replacement program always existing in the memory to supervise the processing in the step S4, and the game program is executed by the emulator, and at a time that the hero or heroine character is read-out by the game program, the graphics data of the hero or heroine character may be replaced with the selected graphics data.

[Other Embodiments or Applicable Examples]

In the case of playing games using an emulator in the first to fifth embodiment, if emulated and converted instructions are stored in order in the work RAM 25 for a constant time (e.g. several minutes or several seconds) so that a program that the CPU 22 executes the temporarily stored instructions at predetermined timing after game-over can be stored as a part of an emulator program, an advantage is available that the game can be easily replayed regardless of a game program structure for the second game machine. The addition of such a program allows a game scene desired by the player to be arbitrarily replayed, thus enhancing player's amusement.

Furthermore, in the above-described embodiments, the game information storage medium which is for the first game machine having a single kind of architecture and stores the game programs for one or two more kinds of second game machine was described, but the technical idea according to the exemplary embodiments is not limited thereto. For example, the present invention can be also applied to the game information storage medium which stores the emulator programs by which the game programs for one or two more kinds of second game machines can be executed on the first game machines each having individual architecture. For example, by executing the game selection program on the first game machine to which the game information storage medium is loaded, the emulator program according to the architecture of the first game machine is selected. Furthermore, the player selects the desired game title. Then, the execution of the game program of the selected game title is started based on the selected emulator program. This causes the player to utilize the single game information storage medium (CD, DVD-ROM, etc.) on plural kinds of first game machines (superior machine or newer-type machine). Therefore, it is possible for the game program makers to avoid a risk that the game information storage medium dedicated for each kind of the game machine and the medium manufactured for a specific game machine remain unsold in a large amount. Incidentally, the selection of the emulator program can be performed by judging the kind of the first game machine by the game selection program, or the name of the first game machine is displayed and then the player decides the name of the first game machine to which the game information storage medium is loaded.

The technical idea of the exemplary embodiments is not limited to storing an emulator program and game program on an information storage medium such as a DVD, CD-ROM or the like, but can be applied for delivering both the data through a bi-directional public line such as the Internet. For example, if the storage data stored on the above game information storage medium (DVD 30) is structurally stored on a storage medium (e.g. hard disk, DVD, etc.) provided in a server apparatus, a similar effect to the effect of the invention can be realized in a game machine on a terminal side connected through an information transmission line such as the Internet with respect to the server apparatus.

That is, a similar effect can be provided for a user on the game machine on the terminal side by delivering, from the server apparatus to the terminal-side game machine, a set of game programs for a plurality of kinds of game machines different in architecture and a plurality of emulator programs to be executed on the terminal-side game machine. Specifically, when the server apparatus is accessed by the terminal-side game machine through the Internet, it transmits a game selection program to the terminal-side game machine. The terminal-side game machine executes the game selection program. A game select screen 51 shown in FIG. 9 is displayed on a display device such as a TV so that a game title desired by a user is selected. When the identification data representative of a selected game title is transmitted to the server apparatus, the server apparatus determines an emulator kind required for the selected game title based on correspondence data between a game title and an emulator as shown in FIG. 12(b). Transmitted are a set of the emulator program and a selected game program to the terminal-side game machine.

This allows the user to play on the terminal-side game machine with game program or the older-generation game machine by use of an emulator. By thus transmitting a set of an emulator and game program, it is possible to play with game program not to be played in nature on a model other than the game machine being used. Incidentally, by saving an emulator kind transmitted to a particular player and the data given correspondence to identification information to identify that player, where the particular player accesses the server apparatus and selects a game title requiring the same kind emulator, then it is also possible to transmit only the same game program.

Furthermore, the above embodiment was explained for the case, as an applicable example of the invention, that the game program for the older-generation game machine manufactured/marketed by the applicant is to be used on the next-generation game machine 20. However, it is pointed out that the invention is applicable not limited to between the older-generation and next-generation game machines of this company but to between the game machines of other manufacturers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A home video game system and game delivery communications system arrangement comprising:
   a network server machine located remotely from the home video game system;
   at least one handheld controller;
   at least one memory device;
   at least one central processor unit (CPU);
   at least one dedicated graphics processing (GPU) unit for rendering video game graphics in accordance with data provided by a video game program for display on a home-use television receiver;
   an audio subsystem for producing sounds in accordance with data provided by a video game program;
   a video game selection program that communicates with a remote network server and displays a game selection menu for requesting video games from the remote server; and
   a bi-directional communications link providing access via the network to said remote network server, wherein the remote network server transmits said video game selection program to the home video game system and said video game selection program enables the home video game system to communicate corresponding player information to said remote network server and obtain a listing of video game titles of video game programs that are stored on said server and which are available for selectively downloading from said server along with appropriate corresponding video game system emulators for controlling said CPU and said GPU to emulate operations of a hardware architecture different from said home video game system, an emulation being at least in part responsive to signals provided by said at least one handheld controller, said video game selection program displaying a menu of game titles on said home-use television receiver comprising at least a list of video game titles selectable by a user using said handheld controller, wherein one or more of said server-stored video games written for one or more different video game systems having a hardware architecture different from said home video game system, and said video game selection program transmitting said player information and identification data representative of a selected game title to the server apparatus, and wherein the server saves information regarding each emulator program type transmitted to a particular player's home video game system, and wherein based on received player-selected game title information the server apparatus transmits a copy of the selected game program and determines a particular corresponding emulator program kind that is required for running the player-selected game program on the home video game system and, based on a server-saved relationship of a correspondence between an emulator kind previously transmitted to a player and the player information received from a player's home video game machine currently accessing the server, the server conditionally transmits a copy of said corresponding emulator program to said appropriate home video game system if that player has not previously been provided with the same emulator type.

2. A home video game system and game delivery communications system arrangement comprising:
   a server apparatus operative to communicate with the home video game system via the network;
   data storage memory comprising a work RAM data storage portion and a VRAM data storage portion;
   at least one control processor unit (CPU);
   at least one dedicated graphics processing unit (GPU) for rendering video game graphics in accordance with data provided by a video game program for display on a home-use television receiver;
   at least one handheld game controller; and
   a bi-directional communications link providing access via the network to a remote server apparatus, wherein the server transmits a video game selection program to the home video game system and the home video game system executes the video game selection program which causes said home video game system to contact said server and download a player selected video game program and an appropriate emulator program for emulating a specific video game platform on the player's particular home video game system, said emulator program controlling said CPU and said GPU to emulate a hardware architecture of a legacy video game system or a hand-held portable video game system, said legacy or portable video game system being different in architecture from said home video game system, said video game selection program displaying a menu of player selectable video game titles on said home-use television receiver to enable a player to select a video game program to obtain from said server, and wherein said video game selection program, in response to a selection of a particular game title from said menu, transmits player information and the player-selected video game title information to the remote server which, in response, provides a game program corresponding to the player-selected game title and wherein, based on a saved relationship of a correspondence between an emulator kind previously transmitted to a player and the player information received from a player's home video game machine currently accessing the server, the server conditionally provides an appropriate emulator program of a type corresponding to the player-selected game title only if the home video game system has not previously been provided with the same emulator type.

3. The home video game system of claim 2, further comprising a removable portable memory card device for temporary storage of game progress data.

4. The home video game system of claim 2, wherein the remote server stores a plurality of different video game programs that are written for said legacy video game system.

5. The home video game system of claim 4, wherein said video game selection program further provides a display on the home-use television receiver which includes one or more titles corresponding to said game programs, said video game selection program further controlling said processor to enable a user to select one of said titles using said game controller so as to initiate emulation of said legacy home video game system and execution of a selected video game program.

6. The home video game system of claim 5, wherein said remote server stores a plurality of different emulator programs and the game selection program selects an emulator program that corresponds to a game program of a game title selected by a user.

7. The home video game system of claim 2, wherein said emulator program comprises a graphic processing emulator program portion and an operation processing emulator program portion, wherein the graphic processing emulator program portion causes the special purpose graphic sub-system to emulate graphic functions of the legacy game system and the operation processing emulator program portion causes the processor to emulate operations performed by a main processor of the legacy game system.

8. The home video game system of claim 2, wherein said emulator program utilizes at least one virtual register when executed by said video game system.

9. A home video game console system and game delivery communications system arrangement comprising:
a home video game console having:
memory for executing game programs,
at least one handheld controller,
at least one central processor unit,
at least one dedicated graphics processing (GPU) unit for rendering video game graphics in accordance with data provided by a video game program for display on a home-use television receiver,
programmed logic circuitry configured to communicate with a remote server via the network;
a remote server apparatus operative to communicate over the network with the home video game console system, the remote server storing a plurality of different video game system emulator program kinds and video game programs, said video game programs designed for executing on video game systems having a different hardware architecture than said home video game console system and said emulator programs being available as different emulator kinds for emulating different video game system hardware;
wherein the video game console system contacts the remote server and receives a video game selection program that displays on said home-use television receiver a menu of one or more video game titles corresponding to video game programs available from said server, and wherein said video game selection program, in response to a selection of a game title from said menu by a player via manipulation of said handheld controller, transmits corresponding game player information and player-selected game title information to the server and, in response, receives a corresponding player-selected video game program and, based upon a saved relationship between an emulator kind previously transmitted to a player and the player information received from a player's home video game machine currently accessing the server, the video game selection program also conditionally receives a corresponding appropriate emulator program kind suitable for enabling execution of said selected video game on the player's home video game system only if that player has not previously been provided with that same emulator by the server, and wherein said server stores and maintains information regarding each video game program and each emulator program previously provided to the home video game system of each player.

10. A method for delivering a video game program and an appropriate game processor emulator program from a server apparatus through a bi-directional public information transmission line for operating on a user's terminal-side home video game machine console system connected via said information transmission line to the server apparatus, comprising:
operating a server apparatus for providing a video game program and an appropriate game processor emulator program to a terminal-side home video game machine console system, said server storing a plurality of different video game processor emulator programs and video game programs;
transmitting a game selection program from the server to the terminal-side game machine in response to the server being accessed by the terminal-side game machine;
receiving player identification information and data representative of a selected game title at the server from the terminal-side game machine, wherein when the player identification information and data representative of a selected game title is received by the server apparatus, the server apparatus determines if an emulator is required for a terminal-side game machine corresponding to the player identification information and, if so, determines an emulator kind required for operating a game program corresponding to the selected game title on the terminal-side game machine; and
transmitting a game program corresponding to the selected game title from the server along with an appropriate emulator for using the game program on the user's terminal-side home video game machine console system, wherein the emulator is transmitted only if that player has not previously been provided with that same emulator by the server.

11. A method for obtaining a video game program and an appropriate game processor emulator program from a server apparatus through a bi-directional public information transmission line for operating on a user's terminal-side home video game machine console system connected via said information transmission line to the server apparatus, comprising:

using the terminal-side game machine to access the server through the public information transmission line;

receiving a game selection program from the server at the terminal-side game machine in response to the server being accessed by the terminal-side game machine;

executing the game selection program on the terminal-side game machine upon receiving the game selection program from the server, wherein the game selection program displays a game title select menu screen on a display device associated with the terminal-side game machine so that a game title may be selected by a user;

transmitting player identification information and data representative of a selected game title to the server apparatus, wherein when the player identification information and data representative of a selected game title is received by the server apparatus, the server apparatus determines if an emulator is required for a terminal-side game machine corresponding to the player identification information and, if so, determines an emulator kind required for operating a game program corresponding to the selected game title on the terminal-side game machine; and receiving a game program corresponding to the selected game title from the server along with an appropriate emulator for using the game program on the user's terminal-side home video game machine console system, wherein the emulator is received only if that player has not previously been provided with that same emulator by the server.

12. A non-transitory physical computer readable storage medium storing one or more sequences of one or more processing instructions which when executed by a computer operating as a server, implement a method for operating the server to provide a video game program and an appropriate game processor emulator program to a terminal-side home video game machine console system, said server storing a plurality of different video game processor emulator programs and video game programs, the processing instructions causing the computer server to perform operations comprising:

transmitting a game selection program from the server to the terminal-side game machine in response to the server being accessed by the terminal-side game machine;

receiving player identification information and data representative of a selected game title at the server from the terminal-side game machine, wherein when the player identification information and data representative of a selected game title is received by the server apparatus, the server apparatus determines if an emulator is required for a terminal-side game machine corresponding to the player identification information and, if so, determines an emulator kind required for operating a game program corresponding to the selected game title on the terminal-side game machine; and transmitting a game program corresponding to the selected game title from the server along with an appropriate emulator for using the game program on the user's terminal-side home video game machine console system, wherein the emulator is transmitted only if that player has not previously been provided with that same emulator by the server.

13. A non-transitory physical computer readable storage medium storing one or more sequences of one or more processing instructions which when executed by a computer operating as a terminal-side home video game machine console system, implement a method for obtaining a video game program and an appropriate game processor emulator program from a remote computer server via a bi-directional public information transmission line for operating on the terminal-side home video game machine console system having an associated display device, the processing instructions causing the terminal-side home video game machine console system to perform operations comprising:

accessing the server through the public information transmission line;

receiving a game selection program from the server at the terminal-side game machine in response to the server being accessed by the terminal-side game machine;

executing the game selection program on the terminal-side game machine upon receiving the game selection program from the server, wherein the game selection program displays a game title select menu screen on the display device associated with the terminal-side game machine so that a game title may be selected by a user;

transmitting player identification information and data representative of a selected game title to the server, wherein when the player identification information and data representative of a selected game title is received by the server apparatus, the server determines if an emulator is required for the terminal-side game machine corresponding to the player identification information and, if so, determines an emulator kind required for operating a game program corresponding to the selected game title on the terminal-side game machine; and receiving a game program corresponding to the selected game title from the server along with an appropriate emulator for using the game program on the user's terminal-side home video game machine console system, wherein the emulator is received only if that player has not previously been provided with that same emulator by the server.

* * * * *